US011800279B2

(12) United States Patent
Zhao et al.

(10) Patent No.: US 11,800,279 B2
(45) Date of Patent: Oct. 24, 2023

(54) HIGH PERFORMANCE TRANSPARENT PIEZOELECTRIC TRANSDUCERS AS AN ADDITIONAL SOUND SOURCE FOR PERSONAL AUDIO DEVICES

(71) Applicant: Meta Platforms Technologies, LLC, Menlo Park, CA (US)

(72) Inventors: Chuming Zhao, Bothell, WA (US); Morteza Khaleghimeybodi, Bothell, WA (US); Antonio John Miller, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/849,085

(22) Filed: Jun. 24, 2022

(65) Prior Publication Data

US 2022/0329933 A1 Oct. 13, 2022

Related U.S. Application Data

(63) Continuation of application No. 17/130,290, filed on Dec. 22, 2020, now Pat. No. 11,405,720.

(51) Int. Cl.

| | |
|---|---|
| ***H04R 17/00*** | (2006.01) |
| ***H04R 1/34*** | (2006.01) |
| ***G02C 11/00*** | (2006.01) |

(52) U.S. Cl.

CPC ............ *H04R 1/345* (2013.01); *G02C 11/10* (2013.01); *H04R 2217/01* (2013.01)

(58) Field of Classification Search

CPC . H04R 17/00; H04R 17/005; H04R 2201/401

See application file for complete search history.

(56) References Cited

U.S. PATENT DOCUMENTS 4,367,426 A * 1/1983 Kumada ................ H03H 9/581 368/255
8,150,061 B2 * 4/2012 Ozawa ...................... H04S 7/30 381/26

(Continued)

FOREIGN PATENT DOCUMENTS

CN 107526184 A 12/2017
CN 107526472 A 12/2017

(Continued)

OTHER PUBLICATIONS

International Search Report and Written Opinion for International Application No. PCT/US2021/064664, dated Jun. 24, 2022, 18 pages.

(Continued)

*Primary Examiner* — Ryan Robinson
(74) *Attorney, Agent, or Firm* — Fenwick & West LLP

(57) ABSTRACT

An audio system comprises an array of transparent piezoelectric transducers on a transparent surface. Each transparent piezoelectric transducer includes one or more piezoelectric layers and one or more conductive layers that are substantially transparent to visible light. A transparent piezoelectric transducer may include, e.g., a first conductive layer, a first piezoelectric layer on the first conductive layer, and a second conductive layer on the first piezoelectric layer. Or in another example, the transparent piezoelectric transducer includes many (e.g., 20-30) piezoelectric layers and many (e.g., 20-30) conductive layers.

18 Claims, 13 Drawing Sheets

(56) References Cited

U.S. PATENT DOCUMENTS

| | | | |
|---|---|---|---|
| 8,824,706 | B2 | 9/2014 | Stephanou et al. |
| 9,161,113 | B1 | 10/2015 | Fenton et al. |
| 9,807,535 | B2 * | 10/2017 | Bostick .................. H04S 7/301 |
| 9,820,055 | B2 | 11/2017 | Babayoff et al. |
| 9,843,881 | B1 * | 12/2017 | Oates, III ................. H04R 5/02 |
| 10,419,843 | B1 | 9/2019 | Mehra et al. |
| 10,462,578 | B2 | 10/2019 | Hoskins et al. |
| 10,685,639 | B2 | 6/2020 | Tzanetos |
| 10,778,824 | B2 | 9/2020 | Hosoi et al. |
| 10,873,800 | B1 | 12/2020 | Khaleghimeybodi |
| 10,904,669 | B1 | 1/2021 | Talakoub et al. |
| 11,030,940 | B2 * | 6/2021 | Watson .................. H04R 1/028 |
| 11,134,334 | B2 * | 9/2021 | Han ....................... H04R 7/045 |
| 11,202,145 | B1 | 12/2021 | Tetsuro et al. |
| 2013/0322663 | A1 | 12/2013 | Melcher et al. |
| 2014/0269207 | A1 | 9/2014 | Baym et al. |
| 2017/0277359 | A1 | 9/2017 | Lee et al. |
| 2019/0312531 | A1 | 10/2019 | Kobrin |
| 2020/0098972 | A1 | 3/2020 | Cakmak et al. |
| 2020/0196082 | A1 * | 6/2020 | Heilemann .......... H04R 1/2811 |
| 2020/0288256 | A1 * | 9/2020 | Jung .................... G06K 9/6201 |
| 2020/0309995 | A1 | 10/2020 | Wells et al. |
| 2021/0337316 | A1 | 10/2021 | Chou et al. |
| 2021/0352390 | A1 | 11/2021 | Lee et al. |
| 2021/0364281 | A1 | 11/2021 | Petill et al. |
| 2022/0232339 | A1 * | 7/2022 | Yoshimura .............. G06T 19/00 |
| 2022/0260664 | A1 * | 8/2022 | Vilermo ................ G01S 3/8006 |

FOREIGN PATENT DOCUMENTS

| | | | | |
|---|---|---|---|---|
| CN | 111757220 | A | 10/2020 | |
| KR | 101323323 | B1 * | 10/2013 | |
| KR | 102310176 | B1 * | 10/2021 | |
| WO | 2016118779 | A1 | 7/2016 | |
| WO | WO-2018195652 | A1 * | 11/2018 | |
| WO | WO-2022001204 | A1 * | 1/2022 | ......... H04N 21/4122 |

OTHER PUBLICATIONS

Invitation to Pay Additional Fees for International Application No. PCT/US2021/064664, dated Apr. 29, 2022, 14 pages.

Koruza J., "Transparent Crystals with Ultrahigh Piezoelectricity," Nature, News and Views [Online], Jan. 15, 2020 [Retrieved Jan. 5, 2021], 6 pages, Retrieved from the internet: URL: https://www.nature.com/articles/d41586-020-00038-z.

Qiu C., et al., "Transparent Ferroelectric Crystals with Ultrahigh Piezoelectricity," Nature, Jan. 2020, vol. 577, pp. 350-354.

Xu S., et al., "Flexible Piezoelectric PMN-PT Nanowire-Based Nanocomposite and Device," Nano Letters, vol. 13 (6), May 1, 2013, pp. 2393-2398.

* cited by examiner

430

Figure 7:
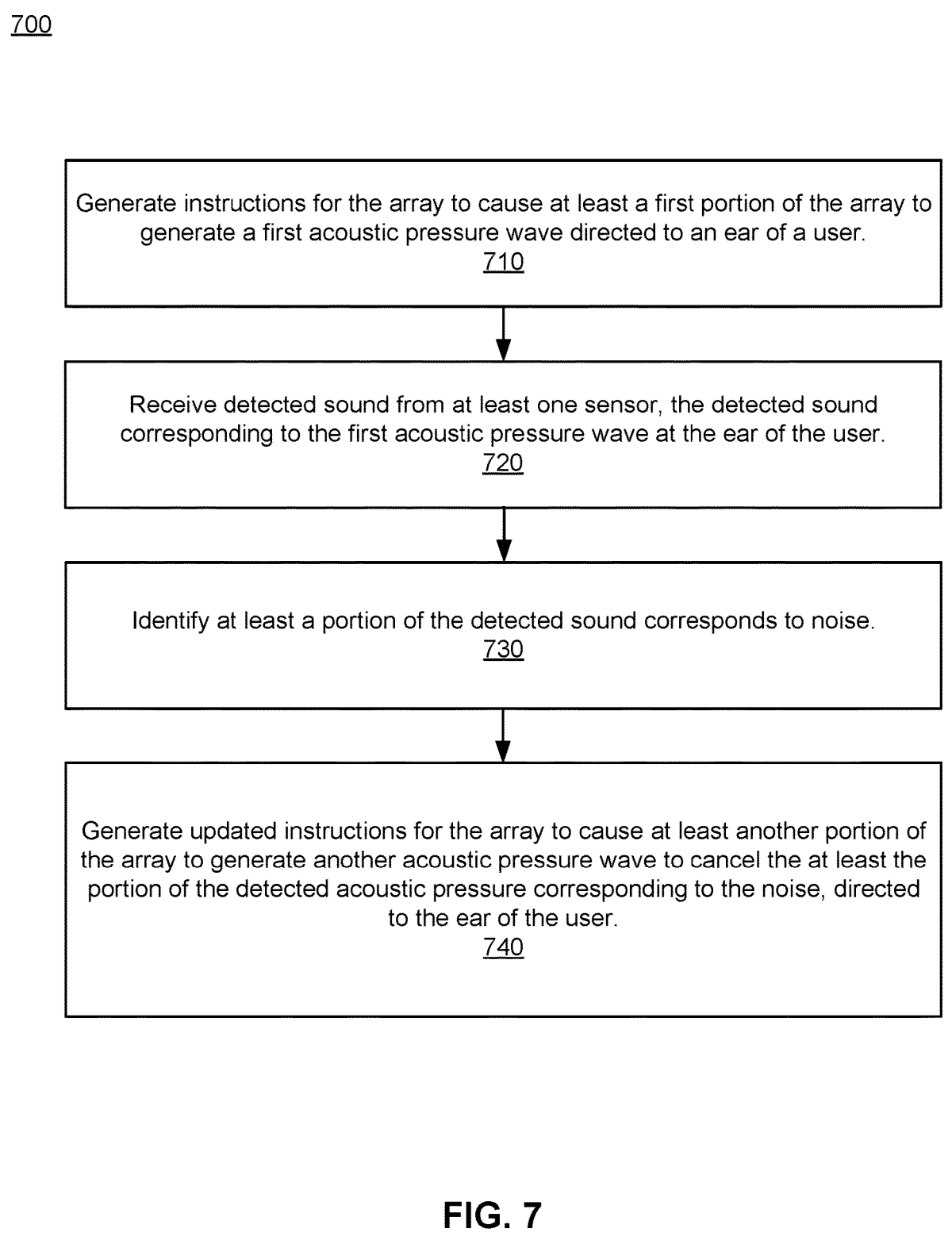

700

Generate instructions for the array to cause at least a first portion of the array to generate a first acoustic pressure wave directed to an ear of a user.
710

Receive detected sound from at least one sensor, the detected sound corresponding to the first acoustic pressure wave at the ear of the user.
720

Identify at least a portion of the detected sound corresponds to noise.
730

Generate updated instructions for the array to cause at least another portion of the array to generate another acoustic pressure wave to cancel the at least the portion of the detected acoustic pressure corresponding to the noise, directed to the ear of the user.
740

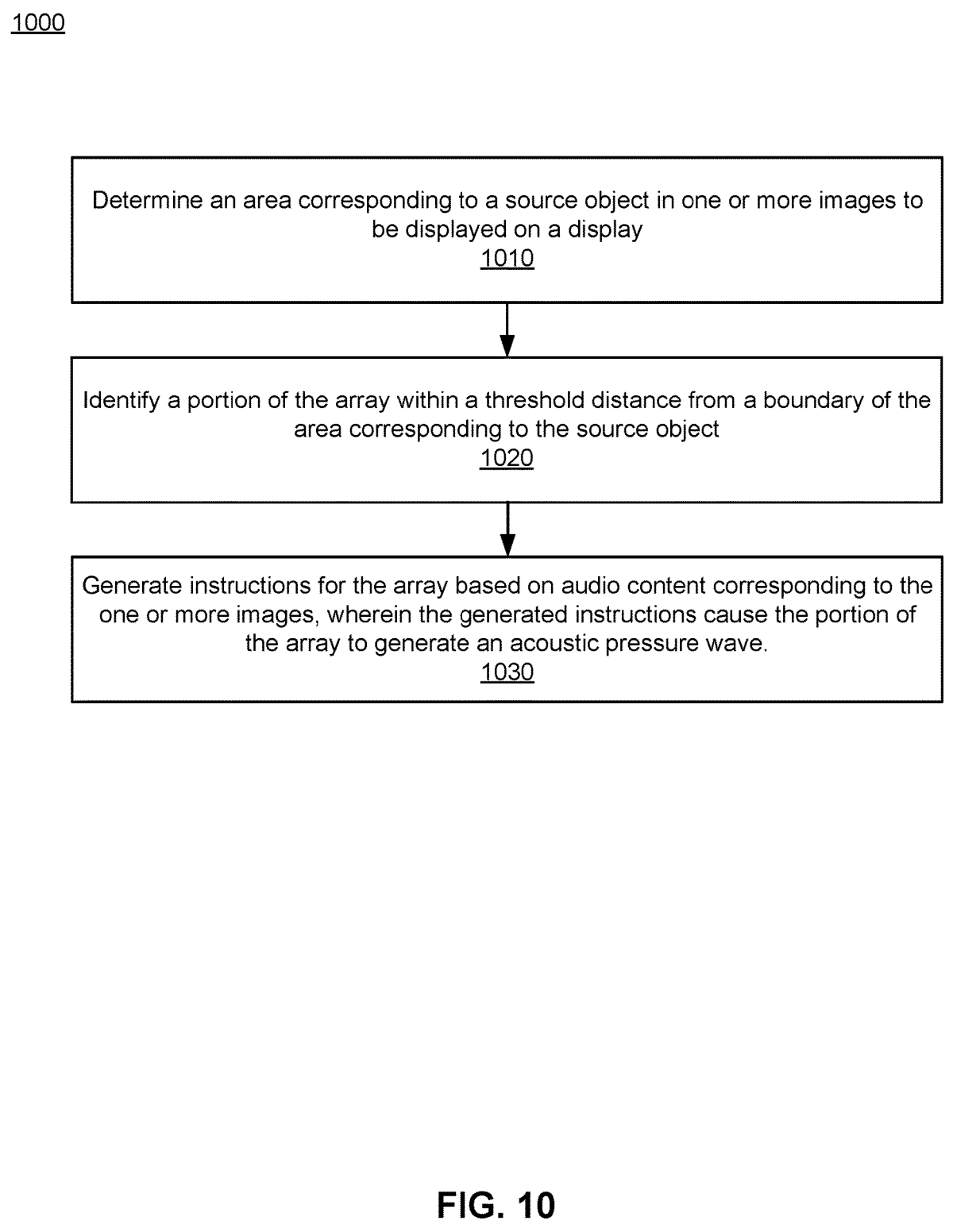

Determine an area corresponding to a source object in one or more images to be displayed on a display
1010

Identify a portion of the array within a threshold distance from a boundary of the area corresponding to the source object
1020

Generate instructions for the array based on audio content corresponding to the one or more images, wherein the generated instructions cause the portion of the array to generate an acoustic pressure wave.
1030

FIG. 10

HIGH PERFORMANCE TRANSPARENT PIEZOELECTRIC TRANSDUCERS AS AN ADDITIONAL SOUND SOURCE FOR PERSONAL AUDIO DEVICES

CROSS REFERENCE TO RELATED APPLICATIONS

This application is a continuation of co-pending U.S. application Ser. No. 17/130,290, filed Dec. 22, 2020, which is incorporated by reference in its entirety.

FIELD OF THE INVENTION

This disclosure relates generally to an audio system for a personal audio device.

BACKGROUND

The size, weight, and power budget allocated for an audio system is limited in personal audio devices. A reduced size and weight of an acoustic transducer or a novel high performance transducer design would be advantageous for personal audio devices.

SUMMARY

A high performance optically transparent piezoelectric transducer array for use in a personal audio device is disclosed. The transparent piezoelectric transducer array is lightweight, has low power consumption and high acoustic output for use as actuators, and can be used as sensors. The transparent piezoelectric transducer array can be placed on an inner side of an eyewear device of a user, such that the user can both see through and enjoy sound generated by at least a portion of the transparent piezoelectric transducer array. At least a portion of the transparent piezoelectric transducer array may detect sound to improve a sound quality of the sound generated by the transparent piezoelectric transducer array. The transparent piezoelectric transducer array can be used in an in-ear device, a display device, or other type of device for the user (e.g., head mounted display, near eye display, glasses, laptop, tablet, monitor, wristband, watch, headphones, TV, earphones, etc.).

An audio system comprises an array of transparent piezoelectric transducers on a transparent surface. Each transparent piezoelectric transducer comprises a first conductive layer, a first piezoelectric layer on the first conductive layer, and a second conductive layer on the first piezoelectric layer. The first conductive layer, the first piezoelectric layer, and the second conductive layer are substantially transparent to visible light.

BRIEF DESCRIPTION OF THE DRAWINGS

FIG. 7 is a flowchart of a method of mitigating crosstalk, in accordance with one or more embodiments.

FIG. 10 is a flowchart illustrating a process for the audio system to generate localized sound from source objects in displayed images in a display device, in accordance with one or more embodiments.

Figure 1A:
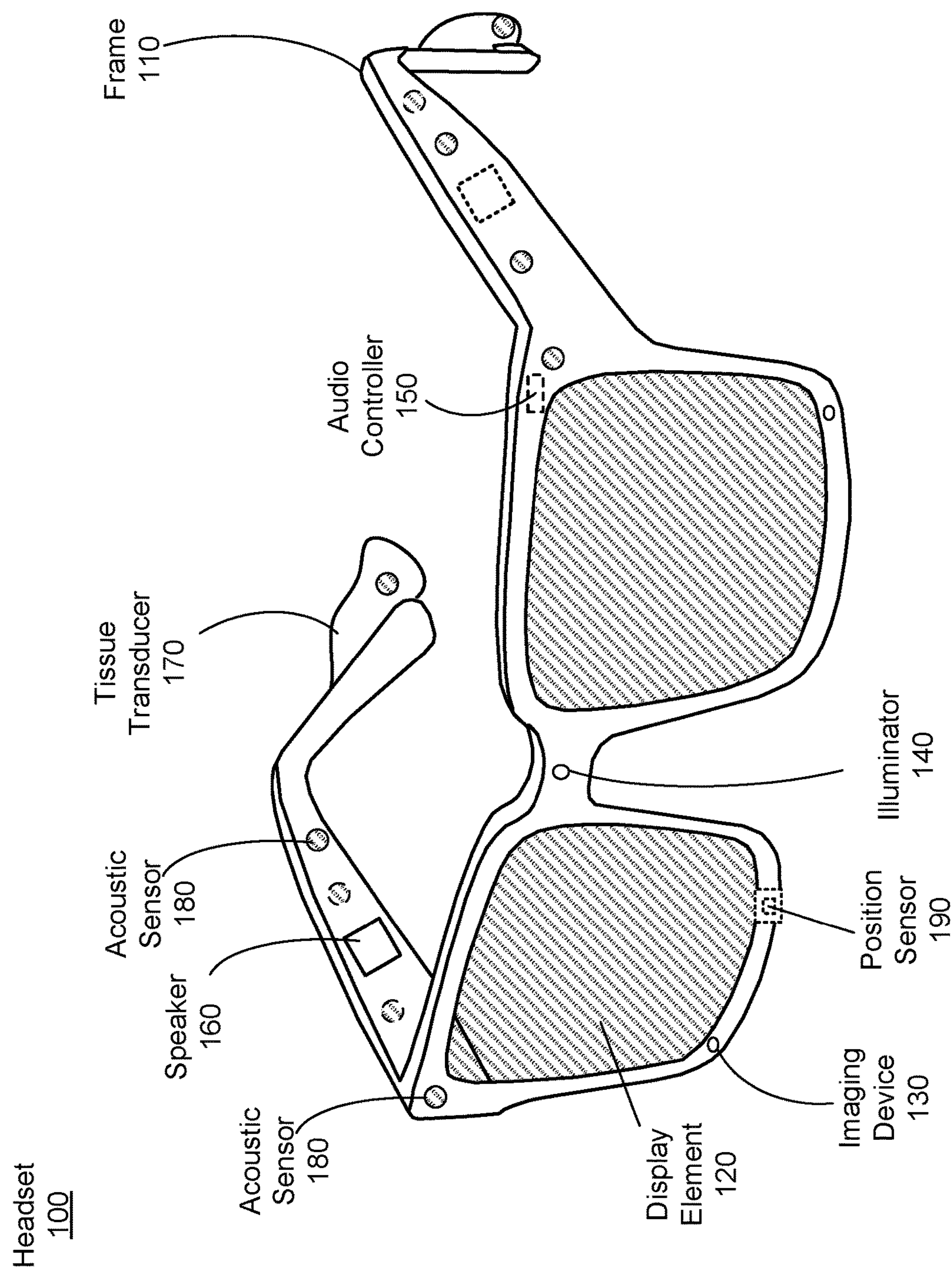
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments relate to a high performance transparent piezoelectric transducer array for use in personal audio devices. An audio system of a personal audio device includes an array of transparent piezoelectric transducers on a transparent surface. Each transparent piezoelectric transducer includes one or more piezoelectric layers and a plurality of conductive layers. For example, a transparent piezoelectric transducer may include a first conductive layer, first piezoelectric layer on the first conductive layer, and a second conductive layer on the first piezoelectric layer. The first conductive layer, the first piezoelectric layer, and the second conductive layer are substantially transparent to visible light. And in other embodiments, there may be many additional layers (e.g., 20) of piezoelectric layers and/or conductive layers. Each transparent piezoelectric transducer may include a back volume, or share a back volume with another piezoelectric transducer. The transparent piezoelectric transducer array may be used as actuators or sensors in the audio system.

The personal audio device may be a head mounted display, near eye display, glasses, laptop, tablet, monitor, wristband, watch, headphones, earphones, etc. In an eyewear device (e.g., head mounted display, near eye display, glasses, etc.), the array of transparent piezoelectric transducer may cover an interior surface of the eyewear device (e.g., surface of the eyewear device facing a user when worn such as lens, frame, temple, etc.). The array of transparent piezoelectric transducers may be used as an actuator (e.g., speakers) to produce sound for the eyewear device, as a sensor to detect sound for use in improving the sound for the eyewear device, as a sensor to detect vibration (e.g., an optically transparent accelerometer, a contact microphone, etc.). A portion of the array of transparent piezoelectric transducers may produce sound directed to an ear of the user. One or more of the transparent piezoelectric transducers of the array on an interior surface (e.g., surface facing a user) of the eyewear device may be used to detect sound at an entrance of the ear of the user. In some embodiments, the audio system may use a transfer function to transform the detected sound from the location of on the eyewear device to sound that would be detected at an entrance of the ear of the user. In some embodiments, the transfer function may be a generic transfer function that may be used for all users. In alternate embodiments, the transfer function may be individualized to the user. As a head geometry, pinna geometry, etc., are different for each individual, the audio system may customize the transfer function to each individual. For example, the audio system may use a trained machine learning model and/or network to customize the transfer function to the individual based on, e.g., the head geometry of the individual, pinna geometry of the individual, etc.

Note that in some embodiments, the audio system may perform active noise cancellation (ANC) using the array of transparent piezoelectric transducers. In some embodiments, a controller of the audio system may determine whether there is noise in the detected sound. The sound may be detected by an acoustic sensor, like, e.g., a conventional microphone, a transparent piezoelectric transducer configured to act as a sensor (e.g., microphone), etc. The controller then generates instructions for some or all of the array of transparent piezoelectric transducers to produce an air pressure wave to cancel the identified noise.

The transparent piezoelectric transducer array may be used in an in-ear device. The transparent piezoelectric transducer array may be used as actuators in the in-ear device and/or sensors (e.g., as a microphone) in the in-ear device.

The personal audio device may be a display device of the user. In a display device of the user (e.g., laptop, tablet, monitor, etc.) the transparent piezoelectric transducer array may cover a surface of the display device. A portion of the transparent piezoelectric transducer array may be used to generate localized sound for a source object displayed in an image of the display device. The term "localized sound" or "localized audio content" refers to sound or audio content that originates from a source object that is displayed in an image on the display device. For example, if the display device displays video of a person speaking—the portion of the transparent piezoelectric transducer array that overlays the mouth of the person speaking would emit the audio content associated with the person speaking.

The transparent piezoelectric transducer array may also be used to provide haptic feedback to a user. A portion of the transparent piezoelectric transducer array may be used to generate localized vibration for a source object displayed in an image to the display device. The term "localized vibration" refers to vibration that originates from a source object that is displayed in an image on the display device.

The transparent piezoelectric transducer array is lightweight and has low power consumption. The transparent piezoelectric transducer array may cover transparent surfaces and still be see-through. The transparent piezoelectric transducer array may have high acoustic output for use as actuators, and may cover an entire audible frequency range (e.g., 20 Hz to 20 kHz). Compared to conventional air conduction audio glasses the transparent piezoelectric transducer array provides a benefit of increased sound pressure level output and less leakage. With the transparent speaker panel, the SPL will be steered more towards the ear.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. The audio system includes an array of transparent piezoelectric transducers which may be a part of the transducer array and/or the sensor array, as described in more detail below. The array of transparent piezoelectric transducers may include a single continuous array of transparent piezoelectric transducers or more than one discrete arrays of transparent piezoelectric transducers covering a surface of a personal device of a user. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. The transducer array may include an array of transparent piezoelectric transducers on any surface of the frame 110, display element 120, a lens, or an optical element of an optics block. The array of transparent piezoelectric transducers may include multiple arrays of transparent piezoelectric transducers (e.g., discrete arrays on the frame, lens, etc.) or may include a single array of transparent piezoelectric transducers (e.g., just one array on the frame, or some other location). A transducer may be a speaker 160 or a tissue transducer 170 (e.g., a bone conduction transducer or a cartilage conduction transducer). The speaker 160 may be an array of transparent piezoelectric transducers. Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. In some embodiments, the speaker array comprising multiple speakers may be an array of transparent piezoelectric transducers covering an interior surface (e.g., surface facing the user when worn) of the frame 110. The tissue transducer 170 couples to the head of the user and directly vibrates tissue (e.g., bone or cartilage) of the user to generate sound. The number and/or locations of transducers may be different from what is shown in FIG. 1A. The tissue transducer 170 may be an array of transparent piezoelectric transducers.

The sensor array detects sounds within the local area of the headset 100. The sensor array includes a plurality of acoustic sensors 180. The sensor array may include an array of transparent piezoelectric transducers, or one or more transparent piezoelectric transducers. An acoustic sensor 180 captures sounds emitted from one or more sound sources in the local area (e.g., a room). The acoustic sensor 180 may an array of transparent piezoelectric transducers, or a transparent piezoelectric transducer. Each acoustic sensor is configured to detect sound and convert the detected sound into an electronic format (analog or digital). The acoustic sensor 180 as a transparent piezoelectric transducer may detect an air pressure wave, or may be in contact with a portion of a user's ear, etc. to indirectly measure a produced air pressure wave through detected vibrations. In these embodiments, the transparent piezoelectric transducer is structurally similar to an actuator, for example, it can be a vibrating membrane, a vibrating cantilever, or a vibrating proof mass with a spring. The transparent high performance piezoelectric material may be located at the area with the most concentrated stress. The piezoelectricity mode can either be a 3-3 mode or a 3-1 mode. The detected air pressure wave or vibrations may be analyzed (e.g., apply transfer function) to estimate a detected air pressure wave at an entrance of an ear of the user. The acoustic sensors 180 may also be other piezoelectric transducers, acoustic wave sensors, microphones, sound transducers, or similar sensors that are suitable for detecting sounds.

In some embodiments, one or more acoustic sensors 180 may be placed in an ear canal of each ear (e.g., acting as binaural microphones). For example, an acoustic sensor 180 may be an in-ear device. The array of transparent piezoelectric transducers may be used as part of an in-ear device. Further detail relating to the in-ear device embodiment can be found in the detailed description of FIG. 8.

In some embodiments, the acoustic sensors 180 may be placed on an exterior surface of the headset 100, placed on an interior surface of the headset 100 (e.g., surface facing a user when worn), separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 generates instructions for the transducer array to generate acoustic pressure waves for presentation to the user. The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. The audio controller 150 may be configured to generate instructions for a transparent piezoelectric transducer array on a display to make it appear that sound is originating from a source object in one or more images displayed on the display.

Note that in some embodiments, the audio system may perform ANC using the array of transparent piezoelectric transducers. The sensor array detects sound from a local area of the headset 100. Note, in embodiments, where feedback and/or adaptive ANC is performed, one or more acoustic sensors of the sensor array are positioned near the entrances to the ear canals and can function as "error" microphones for ANC. And in the case of feedforward ANC, one or more acoustic sensors of the sensor array are positioned on the front frame or temples of the frame and can function as "reference" microphones for ANC. The audio controller 150 may determine whether there is noise in the detected sound. The audio controller 150 then generates instructions for some or all of the array of transparent piezoelectric transducers that are part of the transducer array to produce an air pressure wave to cancel the identified noise.

Note that in this manner, the headset 100 is able to perform open ear ANC—which is not possible with conventional open ear audio systems given that their secondary path response has too much delay at low frequencies (the secondary path is the transfer function between the control sound source and the error microphone/sensor). The use of the transparent piezoelectric transducers mitigates the delay in the secondary path response, and enables the headset 100 to perform open ear ANC. The transparent piezoelectric transducers can have less delay because the transparent piezoelectric transducers can be closer to the ear (the transparency may break the ID limit), and the response of transparent piezoelectric transducers can potentially be faster than that of a conventional dynamic speaker.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The one or more accelerometers may include one or more transparent piezoelectric transducers. In these embodiments, a transparent piezoelectric transducers include a proof mass with an attached spring, and the piezoelectric material will be applied at the spring. In may be configured to operate in a 3 1 mode. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 11.

Figure 1B:
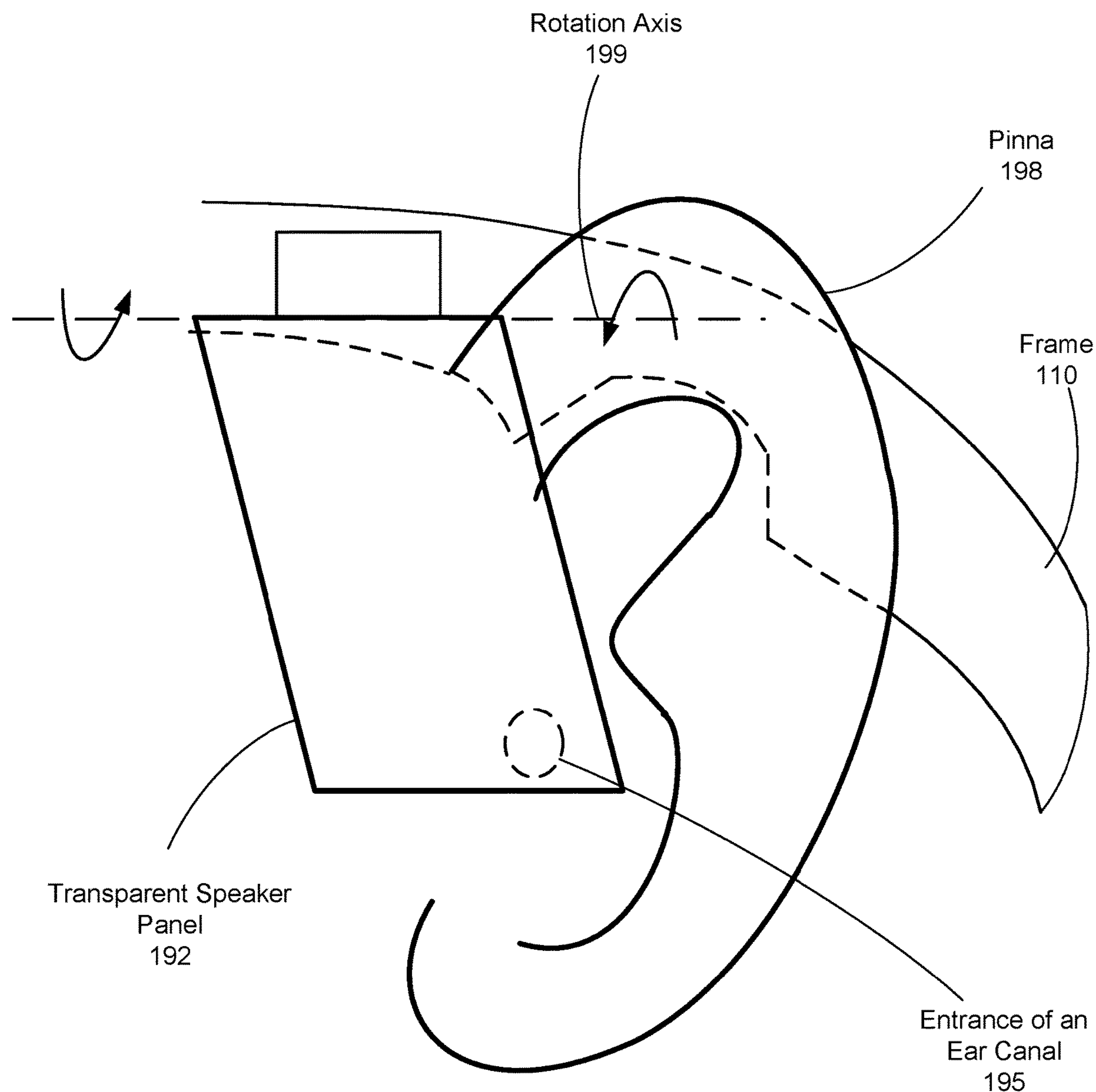
FIG. 1B is a view of a portion the headset of FIG. 1A further including a transparent speaker panel, in accordance with one or more embodiments.

FIG. 1B is a view of a portion the headset 100 of FIG. 1A further including a transparent speaker panel 192, in accordance with one or more embodiments. The transparent speaker panel 192 includes an array of transparent piezoelectric transducers. The transparent speaker panel 192 may be removeable coupled to the frame 110. In some embodiments, the transparent speaker panel 192 is coupled or attached to the frame 110 such that it may rotate about a rotation axis 199 out of the way of a pinna 198 or such that the transparent speaker panel 192 covers a portion of the pinna 198. In some embodiments, when the transparent speaker panel 192 is in a down position (i.e., as illustrated in FIG. 1B), the transparent speaker panel 192 also covers an entrance 195 to an ear canal of the user. Portions of the array of piezoelectric transducers may be on some or all sides of the transparent speaker panel 192. For example, Portions of the array of piezoelectric transducers may be on interior surface (i.e., surface facing the pinna 198 while in the down position), on an outside surface (i.e., outward facing surface that is opposite the interior surface while in the down position), or some combination thereof. The transparent speaker panel 192 may be sized to cover the entrance to the ear canal 195 while the transparent speaker panel 192 is in a down position.

The transparent speaker panel 192 helps steer sound more towards the ear of the user. As such the transparent speaker panel 192 increases sound pressure levels at the entrance to the ear canal 195 and reduces leakage (i.e., sound not making to the entrance to the ear canal 195 and instead propagates out into the local area). Moreover, the transparent speaker panel 192 may function as a vibrating surface that creates an extra sound source. For example, relative to a case with no transparent speaker panel—if a transparent speaker panel is 30 mm×30 mm with a 10 micron input displacement, sound pressure level at the ear canal entrance is increased by at least 15 dB and leakage is reduced by 4 dB.

Figure 2:
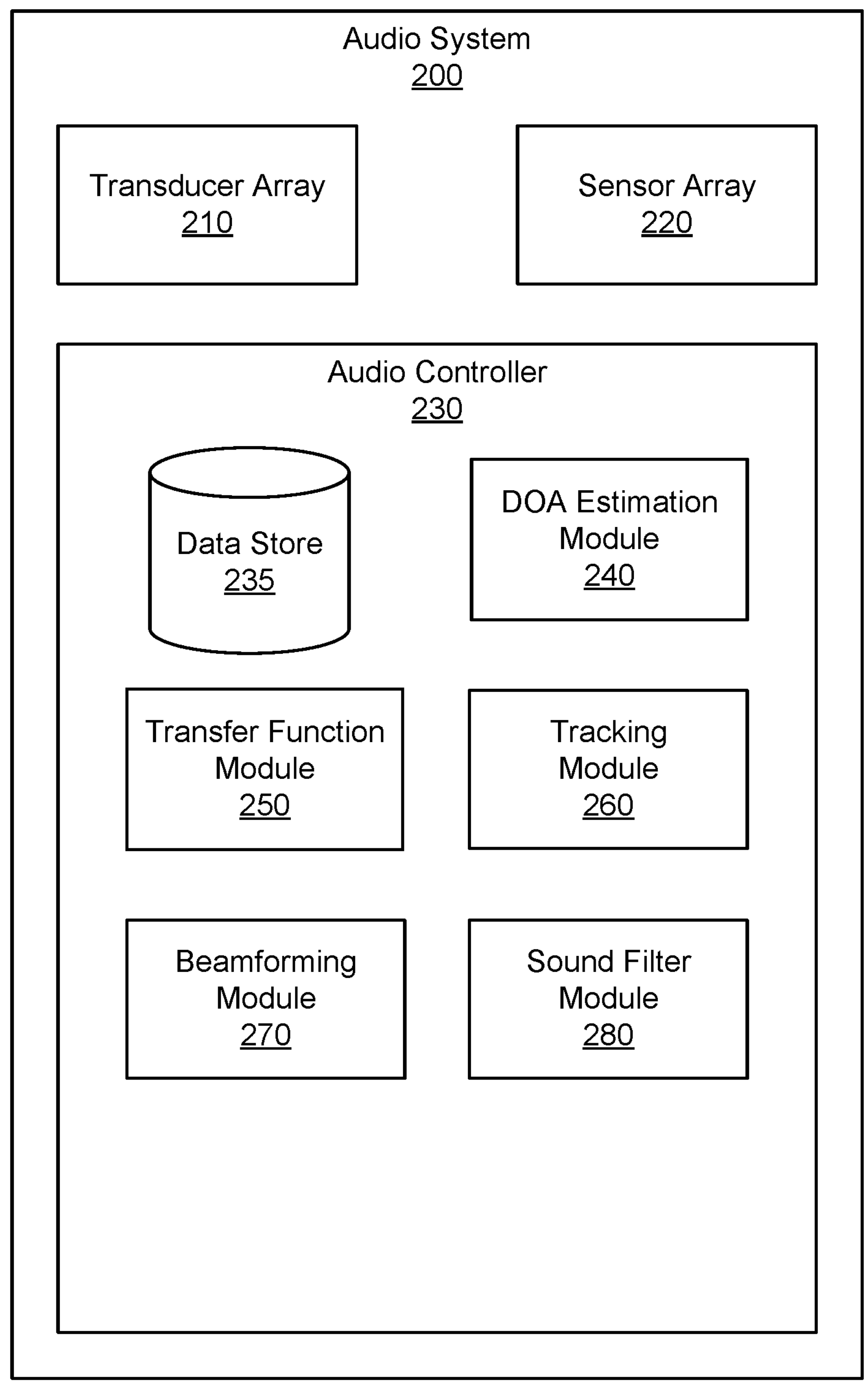
FIG. 2 is a block diagram of an audio system, in accordance with one or more embodiments.

FIG. 2 is a block diagram of an audio system 200, in accordance with one or more embodiments. The audio system in FIG. 1A may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. The audio system 200 includes an array of transparent piezoelectric transducers which may be a part of the transducer array 210 and/or the sensor array 220, as described in more detail below. The array of transparent piezoelectric transducers may include a single continuous array of transparent piezoelectric transducers or more than one discrete arrays of transparent piezoelectric transducers covering a personal device of a user. Some embodiments of the audio system 200 have different components than those described here. Similarly, in some cases, functions can be distributed among the components in a different manner than is described here.

The transducer array 210 is configured to present audio content. The transducer array 210 may include an array of transparent piezoelectric transducers and/or other types of transducers (e.g., other piezoelectric transducers, moving coil transducer, etc.) to provide audio content. The transparent piezoelectric transducer array may present audio content via air conduction and may cover an entire audible frequency range (e.g., 20 Hz to 20 kHz). The transducer array 210 includes a plurality of transducers to provide audio content (e.g., devices that convert electrical energy to sound). A transducer may be, e.g., a speaker (e.g., the speaker 160), a tissue transducer (e.g., the tissue transducer 170), some other device that provides audio content, or some combination thereof. As described above in regard to FIG. 1A, the speaker and/or the tissue transducer may include an array of transparent piezoelectric transducers. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 includes an array of transparent piezoelectric transducers as a speaker to cover an entire audible frequency range. In other embodiments, the transducer array 210 may include one or more transducers to cover different parts of a frequency range. For example, a piezoelectric transducer may be used to cover a first part of a frequency range and a moving coil transducer may be used to cover a second part of a frequency range. In some embodiments, the transparent piezoelectric transducer array may present audio content via bone conduction or cartilage conduction. The transducer structure and mode shape can be similar to that designed for air conduction, but with modifications that are tuned for better performance for use in cartilage conduction or bone conduction.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

In some embodiments, the transducer array 210 is a transparent piezoelectric transducer array on a display device (e.g., tablet, laptop, monitor, etc.) and the audio content may be localized (e.g., localized sound). For example, the display device may display images to a user, and the transparent piezoelectric transducer array covers a transparent display surface of the display device. The transparent piezoelectric transducer array may overlap images displayed on the display device. A portion of the transparent piezoelectric transducer array overlapping a source object (e.g., object in a displayed image from which sound may originate from) may be used as actuators to generate localized audio content. For example, the display may display images of a person who is talking, and a portion of the transparent piezoelectric transducer array overlapping a source object (e.g., mouth of the person) may be activated to produce an air pressure wave as localized audio content (e.g., representing sound originating from a person's mouth).

The sensor array 220 detects sounds within a local area surrounding the sensor array 220. The sensor array 220 may include an array of transparent piezoelectric transducers to detect sounds. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a transparent piezoelectric transducer, a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data. Note that in some embodiments, the audio controller 230 may perform ANC as described above with regard to, e.g., FIG. 1A.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The user may opt-in to allow the data store 235 to record data captured by the audio system 200. In some embodiments, the audio system 200 may employ always on recording, in which the audio system 200 records all sounds captured by the audio system 200 in order to improve the experience for the user. The user may opt in or opt out to allow or prevent the audio system 200 from recording, storing, or transmitting the recorded data to other entities.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. In some instances, the local area may be an area at an entrance of one ear of the user, and the sound that is outside of the region may be sound that is directed to another ear of the user (e.g., crosstalk). The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220. Since this transparent speaker panel includes of an array of small transducers (can be used both as sensors and/or actuators), naturally beamforming microphone algorithms can be applied here. Also, parametric speaker array algorithm to generate specific sound direction can also be used.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 11).

The sound filter module 280 provides the sound filters to the transducer array 210. In some embodiments, the sound filters may cause positive or negative amplification of sounds as a function of frequency.

Figure 3A:
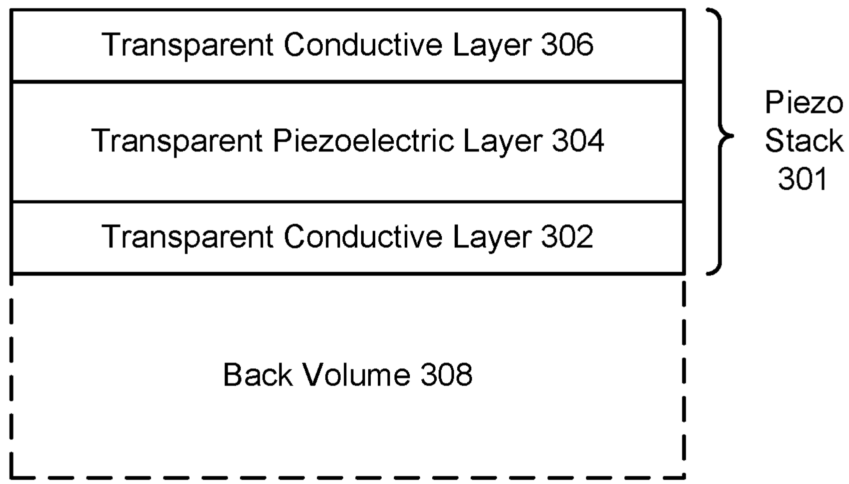
FIG. 3A is a cross section of a transparent piezoelectric transducer including one piezoelectric layer, in accordance with one or more embodiments.

FIG. 3A is a cross section of a transparent piezoelectric transducer 300 including one piezoelectric layer, in accordance with one or more embodiments. The piezoelectric transducer 300 includes a first transparent conductive layer 302, a transparent piezoelectric layer 304, a second transparent conductive layer 306, and optionally a back volume 308. The term "piezo stack" as used herein refers to alternating layers of conductive layers and piezoelectric layers. For example, in FIG. 3A, a piezo stack 301 refers to the conductive layer 302, piezoelectric layer 304, and the conductive layer 306.

The piezoelectric layer 304 can be made of any transparent piezoelectric material. An example of a transparent piezoelectric material is magnesium niobate-lead titanate (PMN-PT), or $(1-x)Pb(Mg_{1/3}Nb_{2/3})O_3$-$xPbTiO_3$ as a single-crystal piezoelectric. In one embodiment, the piezoelectric layer 304 may be made of a piezoelectric nanocomposite. For example, PMN-PT can be synthesized as nanowires and mixed with polydimethylsiloxane (PDMS) to produce a piezoelectric nanocomposite that is flexible. Other examples of transparent piezoelectric material include polyvinylidene fluoride or polyvinylidene difluoride (PVDF) or lithium niobate ($LiNbO_3$). The thickness of the piezoelectric layer 304 may range from, e.g., 1 um to 1 mm.

The transparent conductive layers 302 and 306 can be made of any transparent conductive material. An example of a transparent conductive material is a transparent conducting oxide (TCO) such as indium tin oxide (ITO). The thickness of the transparent conductive layers 302 and 306 may range from, e.g., 1 nm to 100 nm.

The back volume 308 is a volume of air space behind the piezo stack. The back volume 308 may be used to attenuate an out-of phase acoustic pressure wave that is produced by the piezo stack. The back volume may also allow the piezo stack to have a limited amount of air to push against and to prevent the piezo stack from being overdriven. A size of back volume may also adjust the resonance frequency of the system. An increase in back volume may reduce the acoustic resonance, and therefore, it will increase the amount of available bass and increase the sound pressure level (SPL). A decrease in back volume may increase the resonance and reduce the amount of available bass and the SPL of the system. Note that as the size of the back volume increases, the less stiffness it has—and the size of the back volume should be chosen so as to not dominate the stiffness of the whole system. As such, the stiffness of the back volume 308 may be tuned to be equal or less than a stiffness of the vibrating piezoelectric stack diaphragm.

Figure 3B:
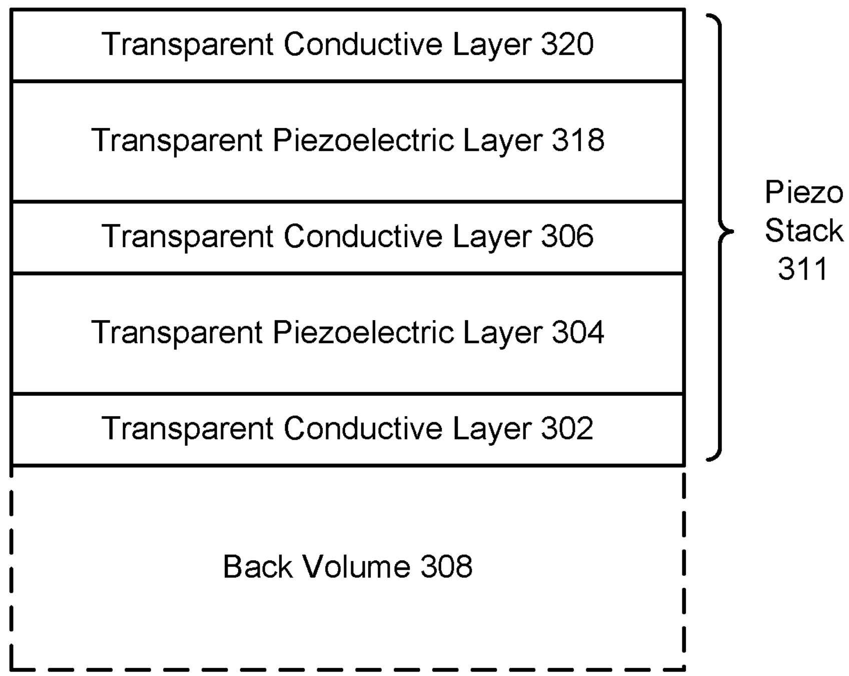
FIG. 3B is a cross section of a transparent piezoelectric transducer including two piezoelectric layers, in accordance with one or more embodiments.

FIG. 3B is a cross section of a transparent piezoelectric transducer 310 including two piezoelectric layers, in accordance with one or more embodiments. The transparent piezoelectric transducer 310 is similar to the piezoelectric transducer 300 except it includes an additional alternating piezoelectric layer and conductive layer. The transparent piezoelectric transducer 310 includes a piezo stack 311 that includes a first transparent conductive layer 302, a first transparent piezoelectric layer 304, a second transparent conductive layer 306, a second piezoelectric layer 318, and a third transparent conductive layer 320. The transparent piezoelectric transducer 310 optionally includes a back volume 308. Although FIGS. 3A and 3B show three and five alternating layers in piezo stack 301 and 311, respectively, a piezo stack can have a different number of alternating layers.

In some embodiments, the transparent piezoelectric transducer array included in audio system 200 may be at least a portion of transducer array 210 and/or the sensor array 220. The transparent piezoelectric transducer array may include, for example, one or more transparent piezoelectric transducers as described in FIGS. 4A, 4B, and 4C. The transparent piezoelectric transducer array includes a plurality of transparent piezoelectric transducers. The transparent piezoelectric transducer array may cover a large area surface, such as an entire viewing surface of a display device or an entire interior surface of an eyewear device (e.g., surface facing the user when worn). The transducer array may cover a more limited surface area, such as portions of a display device or an eyewear device. The transparent piezoelectric transducer array may be a continuous array, or separate arrays (e.g., on an eyewear device, separate arrays for portions on a lens, a frame, etc.). The transparent piezoelectric transducer array may be arranged in one dimension, such as a single row or column of transducers. The transparent piezoelectric transducer array may be arranged in two dimensions, such as rows and columns of transducers. The transparent piezoelectric transducer array may include the piezoelectric transducer array of FIG. 4A, the piezoelectric transducer array of FIG. 4C, or some combination thereof. The transparent piezoelectric transducer array includes a plurality of piezo stacks (e.g., piezo stacks 414 and 416 of FIG. 4A or piezo stacks 434 and 436 of FIG. 4C) and optionally may include corresponding back volume(s) (e.g., back volumes 418 and 420 of FIG. 4A, back volume 438 of FIG. 4C). The transparent piezoelectric transducers, when used as actuators (e.g., included in transducer array 210), have lower power consumption and higher acoustic output for use as actuators in comparison to conventional audio systems.

Figure 4A:
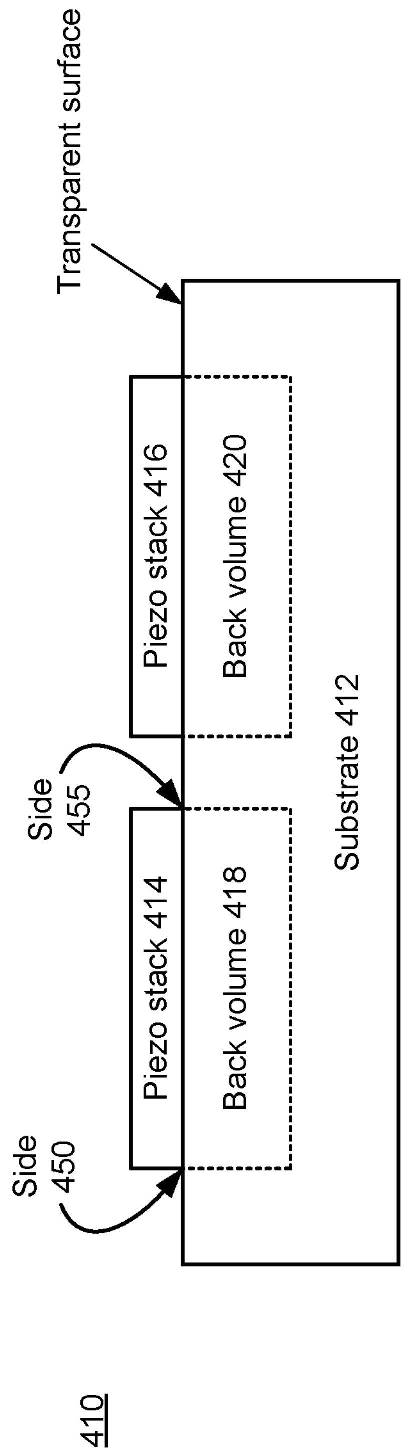
FIG. 4A is a cross section of a portion of a transparent piezoelectric transducer array in a first position, in accordance with one or more embodiments.

FIG. 4A is a cross section of a portion 410 of a transparent piezoelectric transducer array in a first position, in accordance with one or more embodiments. The portion 410 of the transparent piezoelectric transducer array includes a substrate 412, piezo stack 414, and piezo stack 416. The piezo stacks 414 and 416 may be the piezo stack 301 as shown in FIG. 3A, or include additional alternating layers of piezoelectric and conductive layers. The substrate 412 is transparent. In other embodiments, the substrate may be partially transparent or opaque. The piezo stacks 414 and 416 may be surface mounted or bonded onto a substrate 412. The substrate 412 may include recesses to form corresponding back volumes 418 and 420 of the transducers. The substrate 412 may be a frame, lens, optical element of an optics block of an eyewear device, or a cover glass of a display device, etc.

In some embodiments, a piezo stack (e.g., 414 and/or 416) may be configured to actuate in different ways. For example, in some embodiments, a piezo stack may be coupled to the substrate 412 such that it vibrates similar to that of a speaker membrane. In these cases, the piezo stack is coupled to the substrate on 412 on at least two sides that are opposite to each other. For example, the piezo stack 414 includes a side 450 and a side 455 that are opposite to each other, and in some embodiments both of these sides may be coupled to the substrate 412 and a portion of the piezo stack 414 between the sides 450, 455 vibrates up and down.

In some embodiments, a piezo stack may be coupled to the substrate 412 such that it vibrates similar to that of a cantilever. In these cases, the piezo stack is coupled to the substrate on 412 on a single side. For example, the side 450 of the piezo stack 414 is coupled to the substrate 412 and the remaining sides are not coupled to the substrate 412. Accordingly, the piezo stack 414 vibrates up and down with the amount of flexure increasing with distance from the point of attachment (i.e., at the side 450 in this example) to the substrate 412. The benefit of a cantilever over a membrane is that under the same area, a cantilever can create a larger displacement. The disadvantage of the cantilever, compared to a membrane is that it can create a thin slit/gap which allows the air to travel between front and back which may generate some destructive interference.

In some embodiments, the transparent piezoelectric transducer array includes piezo stacks that are configured to vibrate in the same manner. In other embodiments, the transparent piezoelectric transducer array includes at least two piezo stacks that are configured to vibrate in a different manner (e.g., one membrane and another cantilever).

Figure 4B:
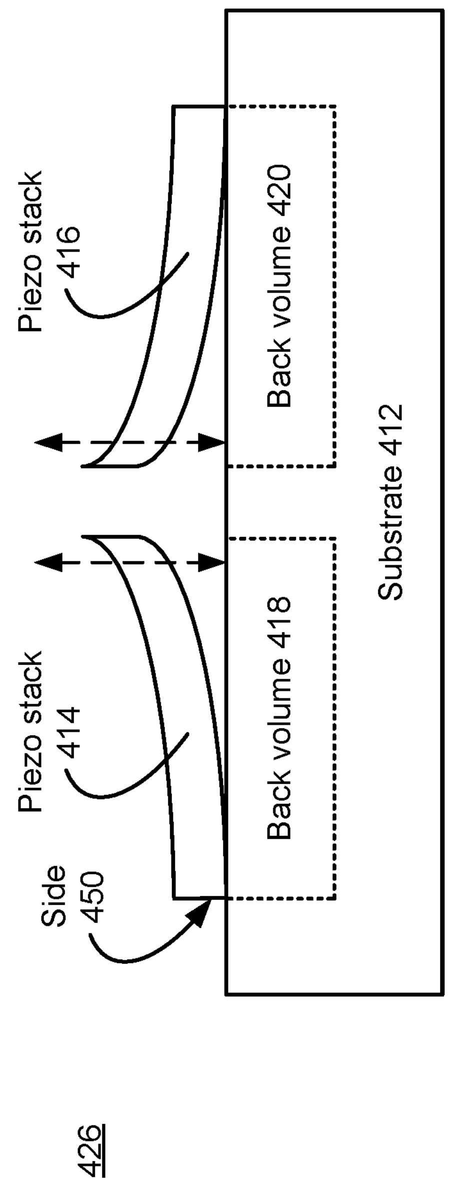
FIG. 4B is a cross section of a portion of a transparent piezoelectric transducer array in a second position, in accordance with one or more embodiments.

FIG. 4B is a cross section of a portion 426 of a transparent piezoelectric transducer array including piezo stacks vibrating similar to cantilevers, in accordance with one or more embodiments. In this embodiment, the piezo stacks 414, 416 are each coupled to the substrate 412 via a single respective side, and vibrate like a cantilever. When the piezo stacks 414 and 416 are in a second position, a free end of the transducers are displaced in a direction away from a surface of the substrate 412. FIG. 4B shows the free ends of the transducers facing each other. However, the free end may be arranged in a different orientation. The movement of the transducers from the first position of FIG. 4A to the second position of FIG. 4B generates a positive air pressure wave in the direction away from the substrate (e.g., towards a user). A negative air pressure wave may be generated towards the direction of the substrate 412. If there is a back volume, this negative air pressure wave may be allowed to dissipate in the back volume.

Figure 4C:
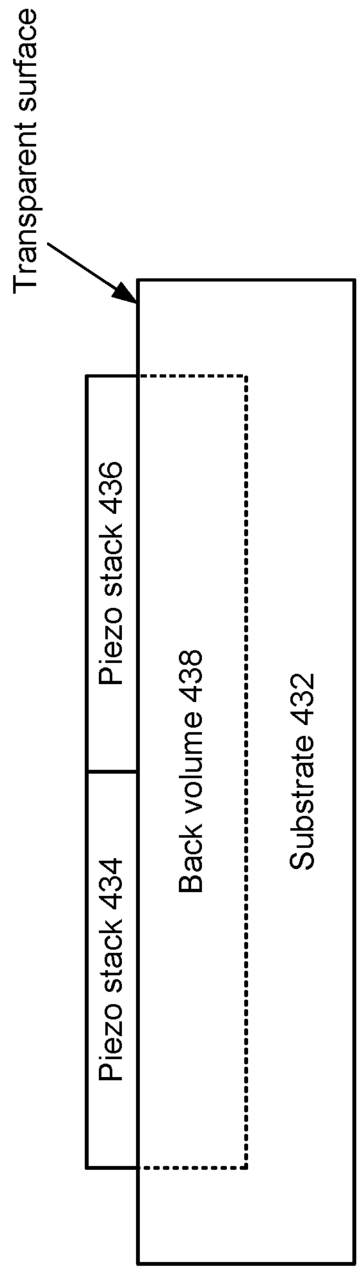
FIG. 4C is a cross section of a portion of a transparent piezoelectric transducer array in a first position, in accordance with one or more embodiments.

FIG. 4C is a cross section of a portion 430 of a transparent piezoelectric transducer array in a first position, in accordance with one or more embodiments. The portion 430 of the piezoelectric transducer array includes a substrate 432 and piezo stacks 434 and 436, and optionally a back volume 438. The substrate 432 is similar to the substrate 412 in FIG. 4A. The piezo stacks 434 and 436 are similar to the piezo stacks 414 and 416 as shown in FIGS. 4A and 4B with respect to the orientation of the fixed ends and the motion, except the piezo stacks 434 and 436 are not spaced apart and share a same optional back volume 438. For example, in some embodiments, the piezo stacks 434 and 436 have free ends that face each other, and the free ends would open up in a similar manner as shown in FIG. 4B (i.e., a cantilever configuration). The movement of the piezo stacks from a first position to a second position generates an air pressure wave away from the substrate 432. A negative air pressure wave may be generated towards the substrate 412. If there is a back volume, this negative air pressure wave may be allowed to dissipate in the back volume 438.

Figure 5:
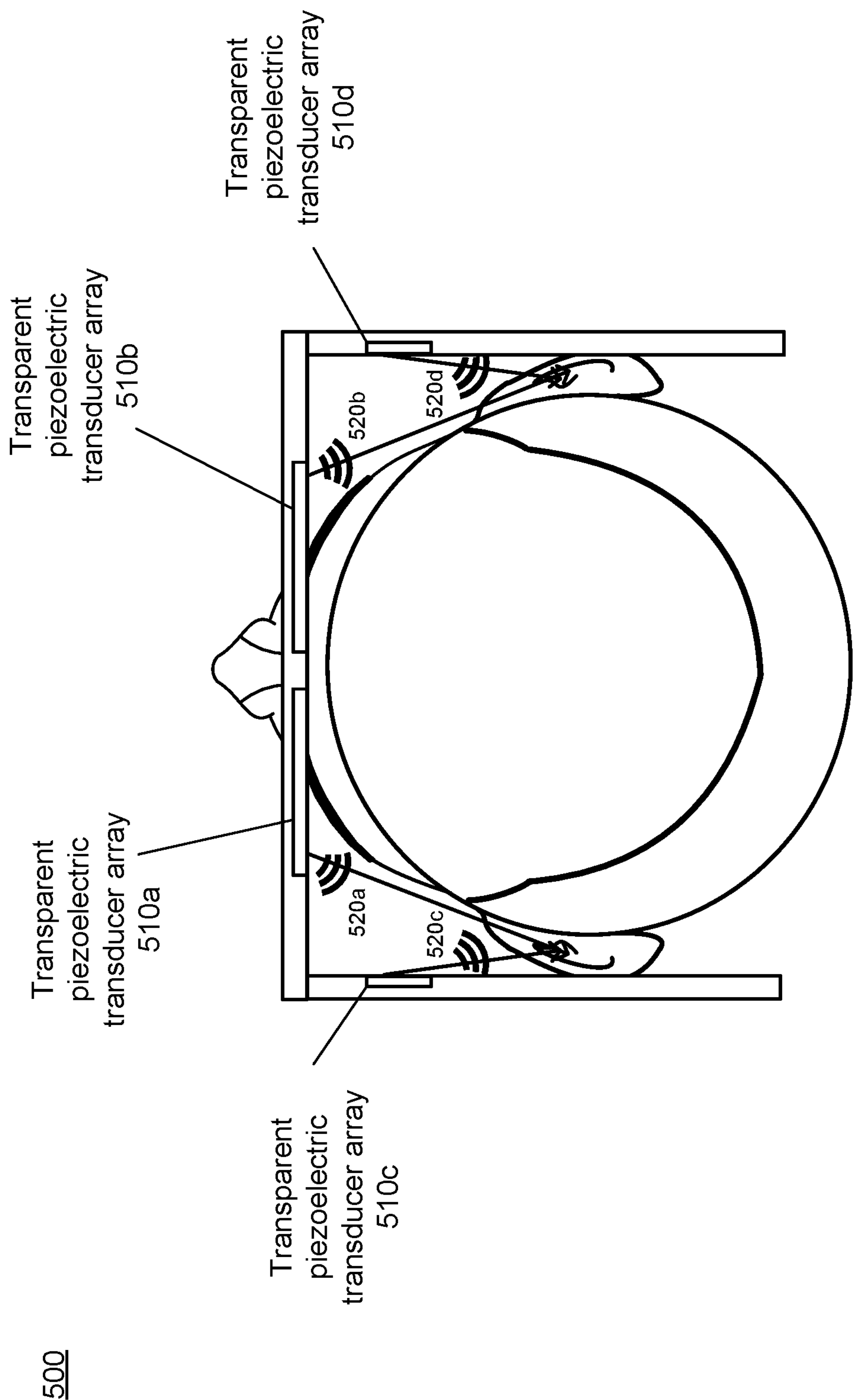
FIG. 5 is a top view of a user wearing an eyewear device including a transparent piezoelectric transducer array to illustrate beamforming and mitigation of crosstalk, in accordance with one or more embodiments.

Although not shown, each transducer in the portion 410 of the transparent piezoelectric transducer array of FIGS. 4A and 4B, and the portion 430 of the transparent piezoelectric transducer array has a corresponding electrodes so that each transducer can be individually driven by an applied voltage. A controller (e.g., controller 150) may apply a voltage from a power supply to a piezoelectric transducer via the electrodes to activate the transducer. FIG. 5 is a top view of a user wearing an eyewear device including a transparent piezoelectric transducer array to illustrate beamforming and mitigation of crosstalk, in accordance with one or more embodiments. The transparent piezoelectric transducer array includes a transparent piezoelectric transducer array 510*a* on the left lens of the eyewear device, a transparent piezoelectric transducer array 510*b* on the right lens of the eyewear device, a transparent piezoelectric transducer array 510*c* on the left temple of the frame of the eyewear device, and a transparent piezoelectric transducer array 510*d* on the right temple of the frame of the eyewear device. The transparent piezoelectric transducer arrays 510*a*, 510*b*, 510*c*, and 510*d* may function as piezoelectric actuators or sensors (e.g., transducer array 210 or sensor array 220 of FIG. 2). An audio system of the eyewear device (e.g., a beamforming module 270 of an audio system 200 FIG. 2) may analyze sounds detected by the sensor array (e.g., sensor array 220), combine information from different acoustic sensors to emphasize sound associated from a particular region of the local area (e.g., at an entrance of user's ear) while deemphasizing sound that is from outside of the region (e.g., crosstalk, or sound generated for another ear of the user).

In one embodiment, the transparent piezoelectric transducer arrays 510*a* and 510*b* function as piezoelectric actuators to generate pressure waves to different ears of the user. For example, FIG. 5 illustrates beamforming of generated pressure wave 520*a* and pressure wave 520*b* to different target locations being different ears of a user. In one embodiment, a controller (e.g., audio controller 150 of FIG. 1A, audio controller 230 of FIG. 2, or a different audio controller etc.) is configured to generate instructions to cause a first portion of the transparent piezoelectric transducer array 510*a* to generate a first acoustic pressure wave 520*a* directed to one ear of the user. For example, a portion of the transparent piezoelectric transducer array 510*a* generates a first acoustic pressure wave 520*a* directed to a left ear of a user. The controller is further configured to generate instructions to cause a second portion of the transparent piezoelectric transducer array 510*b* to generate a second acoustic pressure wave 510*c* directed to another ear of the user. For example, a portion of the transparent piezoelectric transducer array 510*b* generates a second acoustic pressure wave 520*b* directed to a right ear of a user. The first instructions and the second instructions may cause the array to generate the first acoustic pressure wave 520*a* and the second acoustic pressure wave 520*b* directed to the left ear and the right ear of a user at a same time.

In one embodiment, portions of the transparent piezoelectric transducer arrays 510*c* and 510*d* may function as sensors and/or actuators to detect sound and generate air pressure waves to cancel detected noise to different ears of the user. For example, FIG. 5 illustrates mitigation of crosstalk through use of air pressures wave 520*c* and 520*d* to destructively interfere with crosstalk or other detected noise that is not intended for the target location. In one embodiment, the controller is configured to receive detected sound corresponding to the first acoustic pressure wave 520*a* at the ear of the user. The sound may be detected using a portion of the transparent piezoelectric transducer arrays 510*c* and 510*d*. For example, the controller may be configured to instruct a portion of the transparent piezoelectric transducer arrays 510*c* and 510*d* to detect sound, and receive the detected sound.

Figure 8:
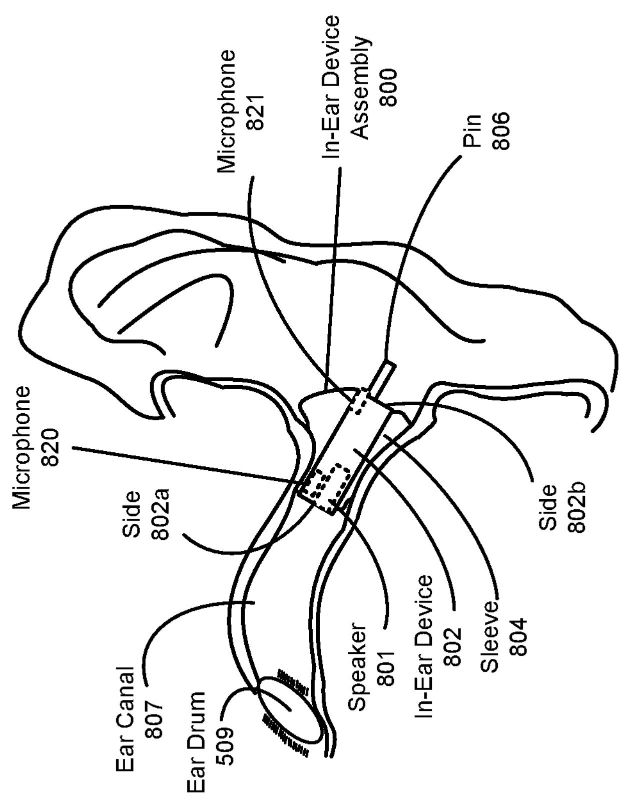
FIG. 8 is a perspective view of an in-ear device assembly including a transparent piezoelectric transducer, in accordance with one or more embodiments.

The controller (e.g., a beamforming module 270 of an audio system 200 FIG. 2) may be configured to analyze the detected sound by applying a transfer function to determine a sound detected at an entrance of the ear of the user. As another example (not shown in FIG. 5), the sound may be detected using microphones at the entrance of an ear of the user to directly detect the sound at the entrance of each ear of the user, and the controller may be configured to instruct the microphones to capture sound data. In one example, the sound may be detected using microphones from an in-ear device assembly of the user (e.g., microphones as shown in FIG. 8). The sound may be also detected using any of the sensors (not shown in FIG. 5) of the sensor array 220 capable of detecting sound that is representative of sound at an entrance of the ear of the user. The controller can compare the detected sound to a target sound (e.g., one intended to be at an entrance of an ear of the user). However, the detected sound may not be the same as the target sound because of crosstalk. For example, if air pressure wave 520*a* and 520*b* are generated at a same time with the intended target of the left ear and right ear, the detected air pressure wave at an entrance of the left ear may include, along with a detected air pressure wave 520*a* intended for the left ear, a portion of the air pressure wave 520*b* intended for the right ear. Similarly, the detected air pressure wave at the entrance of the right ear may include, along with a detected air pressure wave 520*b* intended for the right ear, a portion of the air pressure wave 520*a* intended for the left ear. The controller is configured to identify at least a portion of the detected sound corresponds to noise (e.g., portion of a generated air pressure wave representing crosstalk not intended for the target location), and to generate updated instructions for the array based on the detected sound. The updated instructions may cause at least another portion of the transparent piezoelectric transducers 510*c* to generate another acoustic pressure wave 520*c* to cancel the at least the portion of the detected acoustic pressure wave corresponding to the noise, directed to the ear of the user. For example, the portion of the transparent piezoelectric transducer array 510*c* generates the acoustic pressure wave 520*c* to cancel at least a portion of the detected acoustic pressure wave corresponding to the noise (destructively interfere with the acoustic pressure wave 520*b* that reaches a left ear of the user). Similarly, the portion of the transparent piezoelectric transducer array 510*d* generates the acoustic pressure wave 520*d* to cancel at least a portion of the detected acoustic pressure wave corresponding to noise (destructively interfere with the acoustic pressure wave 520*a* that reaches a right ear of the user). In another example, the first acoustic pressure wave and another acoustic pressure wave may be generated by different portions of a same transparent piezoelectric transducer array (e.g., different portions of a same array 510*a, b, c*, or *d*).

Figure 6:
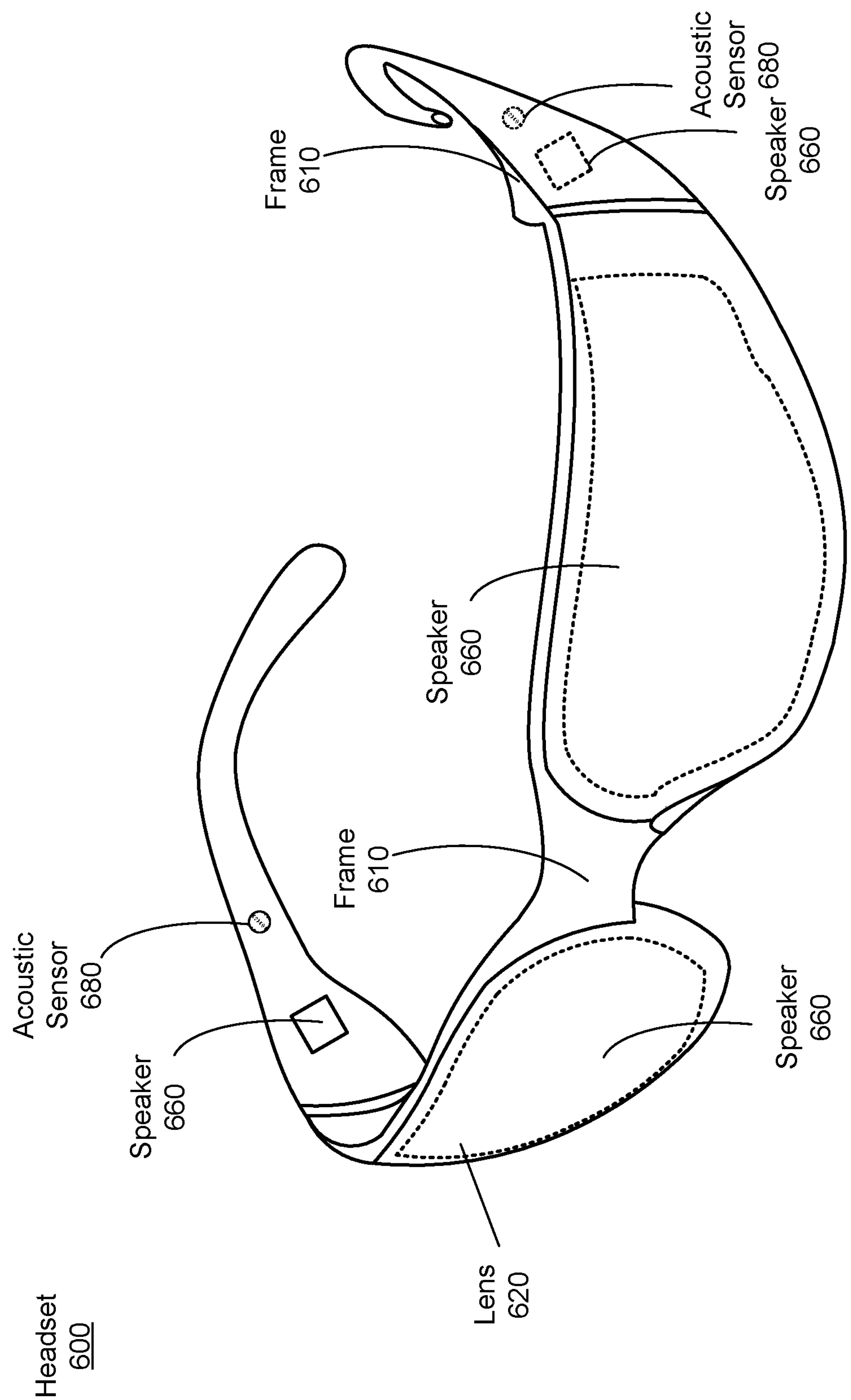
FIG. 6 is a perspective view of a transparent eyewear device including a transparent piezoelectric transducer array, in accordance with one or more embodiments.

FIG. 6 is a perspective view of a transparent eyewear device including a transparent piezoelectric transducer array, in accordance with one or more embodiments. FIG. 6 is a perspective view of a headset 600 implemented as a transparent eyewear device, in accordance with one or more embodiments. In embodiments that describe an AR system and/or a MR system, portions of a front side of the transparent eyewear device are at least partially transparent in the visible band (~380 nm to 750 nm), and portions of the transparent eyewear device that are between the front side of the transparent eyewear device and an eye of the user are at least partially transparent (e.g., a partially transparent electronic display). The headset 600 may include many of the same components described above with reference to FIG. 1A, but modified to be transparent. The headset 600 includes a frame 610, a lenses 620, a speaker 660, and an acoustic sensor 680. While FIG. 6 shows the speaker 660 covering portions of the lenses 620 and temples of the frame 610, and the acoustic sensor 680 covering portions of the frame 610, the transparent piezoelectric transducer array may cover different areas of the lenses 620 and frame 610. The transparent piezoelectric transducer array may cover portions of an interior surface of the headset 600 (e.g., surface facing a user when worn) and/or portions of an exterior surface of the headset 600. For example, the transparent transducer array can cover an entire interior surface of the eyewear device. The transparent transducer array may cover portions of an interior surface of a first lens, a second lens, a first temple arm, and a second temple arm of an eyewear device (e.g., surface facing a user of lenses 620 and frame 610 when worn). The transparent transducer array can cover around 5,000 to 7,000 $mm^2$ of an interior surface of the eyewear device, a larger surface area than a speaker mounted only on the temples of the glasses frame. The transparent transducer array can utilize the large interior surface area of the eyewear device to compensate for a relatively small excursion or displacement of each transparent piezoelectric transducer to obtain a target volume displacement.

FIG. 7 is a flowchart of a method of mitigating crosstalk, in accordance with one or more embodiments. The process shown in FIG. 7 may be performed by components of an audio system (e.g., audio system 200). Other entities may perform some or all of the steps in FIG. 7 in other embodiments. Embodiments may include different and/or additional steps, or perform the steps in different orders.

The audio system (e.g., an audio controller 230 of the audio system 200 of FIG. 2) generates 710 instructions for the array to cause at least a first portion of the array to generate a first acoustic pressure wave directed to an ear of a user. The instructions may cause a portion of the transparent piezoelectric transducer array to move to generate an acoustic pressure wave (e.g., as shown in FIGS. 4A and 4B above).

The audio system receives 720 detected sound from at least one sensor (e.g., one or more sensors of the sensor array 220 of FIG. 2), the detected sound corresponding to the first acoustic pressure wave at the ear of the user. For example, the audio system may detect sound using a portion of the transparent piezoelectric transducer array. The audio system may use at least one of the transparent piezoelectric transducers closer in location to the ear of the user than another one of the transparent piezoelectric transducers in the array to detect sound. The transparent piezoelectric transducer array may be on a frame of the eyewear device (e.g., acoustic sensor 680 of FIG. 6) and not at the ear of the user. The controller may be configured to analyze the detected sound by applying a transfer function to determine a sound detected at an entrance of the ear of the user. As another example, the sound may be detected using microphones at the entrance of an ear of the user to directly detect the sound at the entrance of each ear of the user (e.g., a microphone of in-ear device of FIG. 8). The sound may be also detected using any of the sensors of the sensor array 220 capable of detecting sound that is representative of sound at an entrance of the ear of the user.

The audio system identifies 730 at least a portion of the detected sound corresponds to noise. For example, an audio system of the eyewear device (e.g., a beamforming module 270 of an audio system 200 FIG. 2) may analyze sounds detected by the sensor array (e.g., sensor array 220). The audio system may compare the detected sound to a target sound (e.g., intended sound for the user from the first acoustic pressure wave at the ear of the user). The audio system may filter out the target sound from the detected sound to determine what is noise.

The audio system generates 740 updated instructions for the array to cause at least another portion of the array to generate another acoustic pressure wave to cancel the at least the portion of the detected acoustic pressure corresponding to the noise, directed to the ear of the user. The audio system may have a transparent piezoelectric transducer array including multiple arrays that are all part of the same array (e.g., transparent piezoelectric transducer array 510*a*, 510*b*, 510*c*, and 510*d* in FIG. 5). The audio system may generate the first acoustic pressure wave using a portion of the transparent piezoelectric transducer array 510*a*, and the updated instructions for the transparent piezoelectric transducer array 510*c*.

FIG. 8 is a perspective view of an in-ear device assembly 800 including a transparent piezoelectric transducer array, in accordance with one or more embodiments. The in-ear device assembly 800 includes an in-ear device 802, a sleeve 804, and a pin 806. The sleeve 804 is configured to be coupled to the in-ear device 802. The in-ear device may include a speaker 801 to produce sound. The speaker 801 may include the transparent piezoelectric transducer array. The sleeve 804 may also be referred to as an eartip. The sleeve 804 may be made of silicone, plastic, rubber, polymer, foam, fabric, etc. or some combination thereof. The in-ear device 802 may be removable from the sleeve 804. An interior dimension of the sleeve 804 corresponds to an exterior dimension of the in-ear device 802. An exterior dimension of the sleeve 804 corresponds to a width of the ear canal 807. In some embodiments, there may be a plurality of sleeves that can couple to the in-ear device 802, the interior dimension being a same size to couple to the in-ear device 802, and the exterior dimension of each sleeve being a different size to provide a better fit for different sized ear canals. When the in-ear device assembly 800 is inserted into the ear canal 807, the sleeve 804 can provide a close seal to the ear canal 807. The sleeve 804 may cover only sides of the in-ear device 802 that are adjacent to the ear canal 807. A side 802*a* of the in-ear device 802 may be left uncovered by the sleeve 804 to allow sound produced by the speaker 801 in the in-ear device 802 to be provided via the ear canal 807 towards the ear drum 808 of the user. The in-ear device 802 may include a microphone 820 on side 802*a* which is left uncovered by the sleeve 804 to allow sound internal to the ear canal 807 to reach the microphone 820. The microphone 820 may include a transparent piezoelectric transducer array. The in-ear device 802 may include a microphone 821 on side 802*b* which is left uncovered by the sleeve 804 so that sound external to the ear canal 807 of the user may reach the microphone 821. The microphones or microphone array 821 may include a transparent piezoelectric transducer array. The in-ear device 802 may include a rear port with resistive mesh on side 802*b* which is left uncovered to the local area external to the ear canal.

The pin 806 is coupled to the in-ear device 802 and to enable a user to extract the in-ear device 802 from the ear canal 807. The user may hold onto the pin 806 to insert the in-ear device 802 into the ear canal 807 or remove the in-ear device 802 from the ear canal 807. The pin 806 may be flexible, comfortable, and easy to handle. The pin 806 may be coupled to the in-ear device 802. In other embodiments, the pin 806 may be coupled to the sleeve 804 of the in-ear device, or the pin 806 may be coupled to both the sleeve 804 and the in-ear device 802. In some embodiments, there may not be a pin 806, and the user may extract the in-ear device 802 by handling the sleeve 804.

Figure 9:
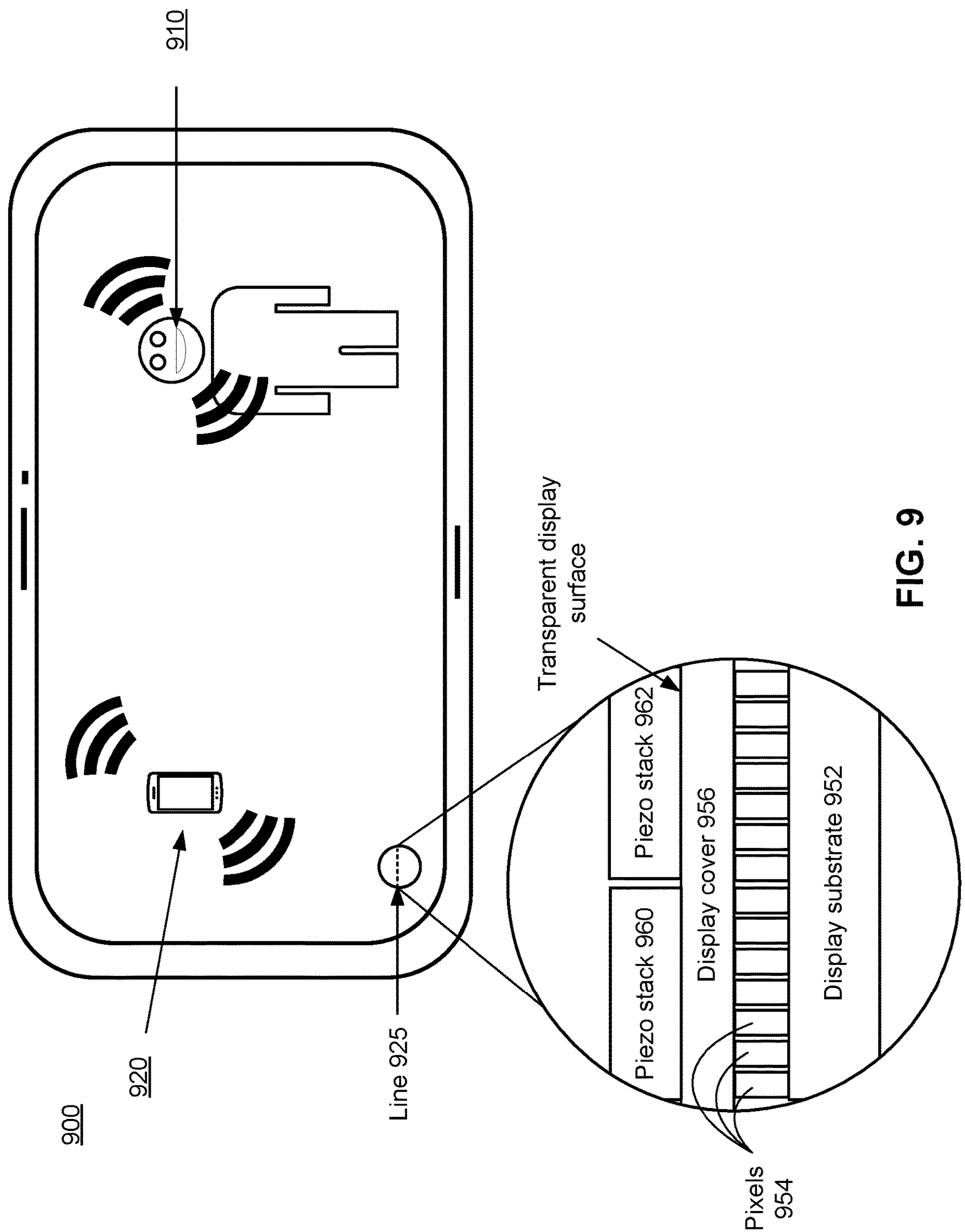
FIG. 9 is an illustration of display device including a transparent piezoelectric transducer array to illustrate generating localized sound from source objects in displayed images, in accordance with one or more embodiments.

FIG. 9 is an illustration of display device 900 including a transparent piezoelectric transducer array to illustrate generating localized sound from source objects in displayed images, in accordance with one or more embodiments. The display device 900 includes an electronic display. For example, the display device 900 may be a tablet, monitor, laptop, or any electronic device that includes an electronic display. An electronic display may be a liquid crystal display (LCD), an organic light emitting diode (OLED) display, an active-matrix organic light-emitting diode display (AMOLED), a waveguide display, some other display, or some combination thereof. A transparent piezoelectric transducer array covers a transparent surface of the electronic display. The transparent piezoelectric transducer array included in audio system 200 of FIG. 2 may be at least a portion of transducer array 210 and/or the sensor array 220. For example, the transducer array 210 includes a transparent piezoelectric transducer array to generate sounds for the user. The display device 900 displays images to a user, and the transparent piezoelectric transducer array generates localized sound for source objects in the images displayed to a user. The transparent piezoelectric transducer array may overlap pixels (or some other display mechanism, e.g., screen, etc.) on the display device 900 that are displaying images. The audio system 200 (e.g., audio controller 230 of the audio system 200 in FIG. 2) may identify one or more objects in the images and determine one or more source objects (e.g., object in a displayed image from which sound may originate from). The audio system 200 may analyze a sound file to identify different localized sounds, and compare the different localized sounds to the identified one or more objects and may match the sounds to the object based on (e.g., matching frequencies of the identified localized sound and motion of the object, object recognition and identification of sound type, etc.). Alternatively, the audio system 200 may receive a localized display sound data file which may identify locations of source objects in the display data and a corresponding localized audio to facilitate providing localized sounds for objects displayed in the image data. A portion of the transparent piezoelectric transducer array overlapping a source object may be used as actuators to generate localized audio content.

Delivering 3D spatial audio may be very similar to HRTF rending of sounds. For example, a location of a target sound can be provided by choosing an azimuth and elevation and convolving the audio data with the corresponding HRTF for a specific azimuth and elevation. This processed file is may then be sent to the transparent piezoelectric transducer array to be rendered for the user.

For example, in FIG. 9, the display device 900 may display images of a person who is talking, and a portion of the transparent piezoelectric transducer array overlapping the pixels displaying a source object (e.g., mouth of the person) may be activated to produce an air pressure wave as localized audio content (e.g., representing sound originating from a person's mouth). At the same time, a phone 920 displayed on the display device 900 may be ringing, and a portion of the transparent piezoelectric transducer array that overlaps the pixels displaying the phone 920 can be utilized to generate sound for the phone 920.

As another example, the display device 900 may show a video of a woman walking on a hard floor in high heels could also be talking, and there could be sounds from the high heels clicking on the hard floor, and sounds from the mouth of the woman who is talking. The audio content for the video displayed on the display device 900 may be mapped to each video frame, so that localized sound may be generated from two different locations: the shoes of the woman and the mouth of the woman. As the woman walks across the floor, the location where the high heels are displayed when it impacts the floor may be the source object for the clicking high heels, and the location of the woman's mouth as she talks is the source object for the woman's voice. The locations of these source objects would change from frame to frame as the woman is walking, and the audio for the sounds of the clicking of the high heels and the woman's mouth would be mapped to the locations of the corresponding source object. Different portions of the transparent transducer array overlapping the source objects would be used as actuators to generate the localized audio content for the clicking heels and the woman's voice as she walks.

A cross section of the display device 900 along a line 925 shows a portion of the display substrate 952, a plurality of pixels 954, a display cover 956, and piezo stacks 960 and 962. The display substrate 952 may be made out of any material that can support the display. For example, the display substrate 952 may be made of glass, plastic, silicon, or any combination thereof. The display cover 956 is transparent and may be made of any material that is transparent. For example, the display cover 956 may be made of glass, crystal, plastic, or any combination thereof. Although not shown, the display cover 956 may optionally include recesses in the transparent display surface corresponding to back volume of each piezo stack 960 and 962. Each piezo stack 960 and 962 may correspond to multiple underlying display pixels 954.

In some embodiments, a transparent piezoelectric transducer array covering a transparent surface of the electronic display may be used to provide haptic feedback to the user, or for haptic applications. For example, instead of generating sound waves by an overlapping portion of transparent piezoelectric transducer array in areas around the phone 920, the transparent piezoelectric transducer array may provide localized vibration of the phone 920. Just like using this transducer for cartilage conduction, the same transducer can be also used for haptic application, with the modification to tune the transducer for use for the specific load impedance (either mounted on a phone or direct in contact with the hand).

FIG. 10 is a flowchart 1000 illustrating a process for the audio system to generate localized sound in a display device from source objects in displayed images, in accordance with one or more embodiments. The process shown in FIG. 10 may be performed by components of an audio system (e.g., audio system 200). Other entities may perform some or all of the steps in FIG. 10 in other embodiments. Embodiments may include different and/or additional steps, or perform the steps in different orders.

The audio system (e.g., an audio controller of the audio system) determines 1010 an area corresponding to a source object in one or more images to be displayed on a display. For example, as described in regard to FIG. 9, the audio system 200 (e.g., audio controller 230 of the audio system 200 in FIG. 2) may identify one or more objects in the images and determine one or more source objects. The audio system may analyze a sound file to identify different localized sounds. The audio system may compare the different localized sounds to the identified one or more objects and may match the sounds to the object based on matching occurrences of the identified localized sound and motion of the object. For example, if localized sound occurs at a same time during an impact of two objects (e.g., impact of high heel on a hard floor), the audio system may map the localized sound to the impact of two objects. As another example, if an object is moving, such as a mouth, the audio system may identify a face of a person, and its mouth. The audio system may also identify a localized sound as a certain type of sound (e.g., identify that language being spoken, etc.) and map the spoken language to the source object of the person's mouth. Alternatively, the audio system 200 may receive a localized display sound data file which may identify locations of source objects in the display data and a corresponding localized audio to facilitate providing localized sounds for objects displayed in the image data. A portion of the transparent piezoelectric transducer array overlapping a source object may be used as actuators to generate localized audio content.

The audio system identifies 1020 a portion of the array within a threshold distance from a boundary of the area corresponding to the source object. In some embodiments, the threshold is de minimis and basically maps to the boundary of the area such that the boundary of the area corresponding to the source object matches an area of the portion of the array. In other embodiments, the threshold distance may have a value based on a number of transparent piezoelectric transducer that are needed to cover the source object.

The audio system generates 1030 instructions for the array based on audio content corresponding to the one or more images, wherein the generated instructions cause the portion of the array to generate an acoustic pressure wave.

Figure 11:
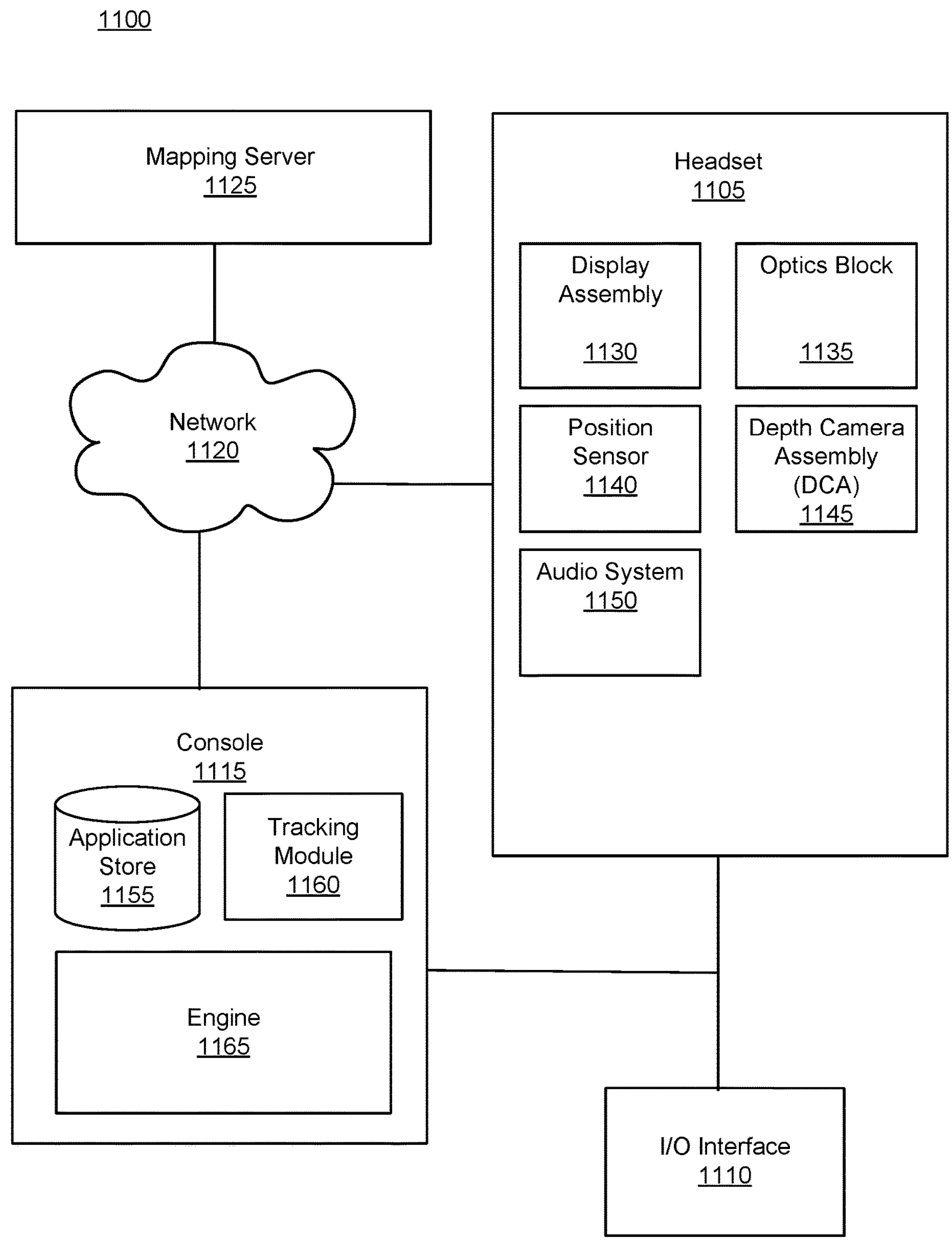
FIG. 11 is a system that includes a headset with the audio system, in accordance with one or more embodiments.

FIG. 11 is a system 1100 that includes a headset 1105, in accordance with one or more embodiments. In some embodiments, the headset 1105 may be the headset 100 of FIG. 1A. The system 1100 may operate in an artificial reality environment (e.g., a virtual reality environment, an augmented reality environment, a mixed reality environment, or some combination thereof). The system 1100 shown by FIG. 11 includes the headset 1105, an input/output (I/O) interface 1110 that is coupled to a console 1115, the network 1120, and the mapping server 1125. While FIG. 11 shows an example system 1100 including one headset 1105 and one I/O interface 1110, in other embodiments any number of these components may be included in the system 1100. For example, there may be multiple headsets each having an associated I/O interface 1110, with each headset and I/O interface 1110 communicating with the console 1115. In alternative configurations, different and/or additional components may be included in the system 1100. Additionally, functionality described in conjunction with one or more of the components shown in FIG. 11 may be distributed among the components in a different manner than described in conjunction with FIG. 11 in some embodiments. For example, some or all of the functionality of the console 1115 may be provided by the headset 1105.

The headset 1105 includes the display assembly 1130, an optics block 1135, one or more position sensors 1140, and the DCA 1145. Some embodiments of headset 1105 have different components than those described in conjunction with FIG. 11. Additionally, the functionality provided by various components described in conjunction with FIG. 11 may be differently distributed among the components of the headset 1105 in other embodiments, or be captured in separate assemblies remote from the headset 1105.

The display assembly 1130 displays content to the user in accordance with data received from the console 1115. The display assembly 1130 displays the content using one or more display elements (e.g., the display elements 120). A display element may be, e.g., an electronic display. In various embodiments, the display assembly 1130 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element may also include some or all of the functionality of the optics block 1135.

The optics block 1135 may magnify image light received from the electronic display, corrects optical errors associated with the image light, and presents the corrected image light to one or both eyeboxes of the headset 1105. In various embodiments, the optics block 1135 includes one or more optical elements. Example optical elements included in the optics block 1135 include: an aperture, a Fresnel lens, a convex lens, a concave lens, a filter, a reflecting surface, or any other suitable optical element that affects image light. Moreover, the optics block 1135 may include combinations of different optical elements. In some embodiments, one or more of the optical elements in the optics block 1135 may have one or more coatings, such as partially reflective or anti-reflective coatings.

Magnification and focusing of the image light by the optics block 1135 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 1135 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1135 corrects the distortion when it receives image light from the electronic display generated based on the content.

The position sensor 1140 is an electronic device that generates data indicating a position of the headset 1105. The position sensor 1140 generates one or more measurement signals in response to motion of the headset 1105. The position sensor 190 is an embodiment of the position sensor 1140. Examples of a position sensor 1140 include: one or more transparent piezoelectric transducers, one or more IMUs, one or more accelerometers, one or more gyroscopes, one or more magnetometers, another suitable type of sensor that detects motion, or some combination thereof. The position sensor 1140 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1105 from the sampled data. For example, the IMU integrates the measurement signals received from the accelerometers over time to estimate a velocity vector and integrates the velocity vector over time to determine an estimated position of a reference point on the headset 1105. The reference point is a point that may be used to describe the position of the headset 1105. While the reference point may generally be defined as a point in space, however, in practice the reference point is defined as a point within the headset 1105. The position sensor 1140 may include one or more transparent piezoelectric transducers. For example, the accelerometers may be a transparent piezoelectric transducer. The DCA 1145 generates depth information for a portion of the local area. The DCA includes one or more imaging devices and a DCA controller. The DCA 1145 may also include an illuminator. Operation and structure of the DCA 1145 is described above with regard to FIG. 1A.

The audio system 1150 provides audio content to a user of the headset 1105. The audio system 1150 is substantially the same as the audio system 200 describe above. The audio system 1150 includes an array of transparent piezoelectric transducers. The audio system 1150 may comprise one or acoustic sensors, one or more transducers, and an audio controller. The array of transparent piezoelectric transducers may be a part of the one or more acoustic sensors and/or the one or more transducers, as described in more detail below. The array of transparent piezoelectric transducers may include a single continuous array of transparent piezoelectric transducers or more than one discrete arrays of transparent piezoelectric transducers covering a personal device of a user. The transparent piezoelectric transducer array as part of one or more transducers may present audio content via air conduction and may cover an entire audible frequency range (e.g., 20 Hz to 20 kHz). The transparent piezoelectric transducer array as part of the one or more acoustic sensors may detect an air pressure wave, or may be in contact with a portion of a user's ear, etc. to indirectly measure a produced air pressure wave through detected vibrations. The audio system 1150 may provide spatialized audio content to the user. In some embodiments, the audio system 1150 may request acoustic parameters from the mapping server 1125 over the network 1120. The acoustic parameters describe one or more acoustic properties (e.g., room impulse response, a reverberation time, a reverberation level, etc.) of the local area. The audio system 1150 may provide information describing at least a portion of the local area from e.g., the DCA 1145 and/or location information for the headset 1105 from the position sensor 1140. The audio system 1150 may generate one or more sound filters using one or more of the acoustic parameters received from the mapping server 1125, and use the sound filters to provide audio content to the user.

The I/O interface 1110 is a device that allows a user to send action requests and receive responses from the console 1115. An action request is a request to perform a particular action. For example, an action request may be an instruction to start or end capture of image or video data, or an instruction to perform a particular action within an application. The I/O interface 1110 may include one or more input devices. Example input devices include: a keyboard, a mouse, a game controller, or any other suitable device for receiving action requests and communicating the action requests to the console 1115. An action request received by the I/O interface 1110 is communicated to the console 1115, which performs an action corresponding to the action request. In some embodiments, the I/O interface 1110 includes an IMU that captures calibration data indicating an estimated position of the I/O interface 1110 relative to an initial position of the I/O interface 1110. In some embodiments, the I/O interface 1110 may provide haptic feedback to the user in accordance with instructions received from the console 1115. For example, haptic feedback is provided when an action request is received, or the console 1115 communicates instructions to the I/O interface 1110 causing the I/O interface 1110 to generate haptic feedback when the console 1115 performs an action. In some embodiments, a transparent piezoelectric transducer may be used to provide haptic feedback to the user, or for haptic applications.

The console 1115 provides content to the headset 1105 for processing in accordance with information received from one or more of: the DCA 1145, the headset 1105, and the I/O interface 1110. In the example shown in FIG. 11, the console 1115 includes an application store 1155, a tracking module 1160, and an engine 1165. Some embodiments of the console 1115 have different modules or components than those described in conjunction with FIG. 11. Similarly, the functions further described below may be distributed among components of the console 1115 in a different manner than described in conjunction with FIG. 11. In some embodiments, the functionality discussed herein with respect to the console 1115 may be implemented in the headset 1105, or a remote system.

The application store 1155 stores one or more applications for execution by the console 1115. An application is a group of instructions, that when executed by a processor, generates content for presentation to the user. Content generated by an application may be in response to inputs received from the user via movement of the headset 1105 or the I/O interface 1110. Examples of applications include: gaming applications, conferencing applications, video playback applications, or other suitable applications.

The tracking module 1160 tracks movements of the headset 1105 or of the I/O interface 1110 using information from the DCA 1145, the one or more position sensors 1140, or some combination thereof. For example, the tracking module 1160 determines a position of a reference point of the headset 1105 in a mapping of a local area based on information from the headset 1105. The tracking module 1160 may also determine positions of an object or virtual object. Additionally, in some embodiments, the tracking module 1160 may use portions of data indicating a position of the headset 1105 from the position sensor 1140 as well as representations of the local area from the DCA 1145 to predict a future location of the headset 1105. The tracking module 1160 provides the estimated or predicted future position of the headset 1105 or the I/O interface 1110 to the engine 1165.

The engine 1165 executes applications and receives position information, acceleration information, velocity information, predicted future positions, or some combination thereof, of the headset 1105 from the tracking module 1160. Based on the received information, the engine 1165 determines content to provide to the headset 1105 for presentation to the user. For example, if the received information indicates that the user has looked to the left, the engine 1165 generates content for the headset 1105 that mirrors the user's movement in a virtual local area or in a local area augmenting the local area with additional content. Additionally, the engine 1165 performs an action within an application executing on the console 1115 in response to an action request received from the I/O interface 1110 and provides feedback to the user that the action was performed. The provided feedback may be visual or audible feedback via the headset 1105 or haptic feedback via the I/O interface 1110.

The network 1120 couples the headset 1105 and/or the console 1115 to the mapping server 1125. The network 1120 may include any combination of local area and/or wide area networks using both wireless and/or wired communication systems. For example, the network 1120 may include the Internet, as well as mobile telephone networks. In one embodiment, the network 1120 uses standard communications technologies and/or protocols. Hence, the network 1120 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1120 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 1125 may include a database that stores a virtual model describing a plurality of spaces, wherein one location in the virtual model corresponds to a current configuration of a local area of the headset 1105. The mapping server 1125 receives, from the headset 1105 via the network 1120, information describing at least a portion of the local area and/or location information for the local area. The user may adjust privacy settings to allow or prevent the headset 1105 from transmitting information to the mapping server 1125. The mapping server 1125 determines, based on the received information and/or location information, a location in the virtual model that is associated with the local area of the headset 1105. The mapping server 1125 determines (e.g., retrieves) one or more acoustic parameters associated with the local area, based in part on the determined location in the virtual model and any acoustic parameters associated with the determined location. The mapping server 1125 may transmit the location of the local area and any values of acoustic parameters associated with the local area to the headset 1105.

One or more components of system 1100 may contain a privacy module that stores one or more privacy settings for user data elements. The user data elements describe the user or the headset 1105. For example, the user data elements may describe a physical characteristic of the user, an action performed by the user, a location of the user of the headset 1105, a location of the headset 1105, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 1100 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

determining an area corresponding to a source object in one or more images to be displayed on an electronic display;

identifying a portion of a piezoelectric transducer array within a threshold distance from a boundary of the area corresponding to the source object;

generating instructions for at least the portion of the piezoelectric transducer array based on audio content associated with the source object in the one or more images; and providing the generated instructions to the piezoelectric transducer array, wherein the generated instructions cause the portion of the array to generate an acoustic pressure wave, wherein at least one piezoelectric transducer has a fixed end coupled to a transparent surface and a free end opposite to the fixed end, the transparent surface located between the electronic display and the piezoelectric transducer array, and the free end configured to be displaced in a direction towards or away from the transparent surface to generate an acoustic pressure wave.

2. The method of claim 1, wherein the piezoelectric transducer array covers the electronic display.

3. The method of claim 1, further comprising:

determining a second area corresponding to a second source object in the one or more images to be displayed on an electronic display;

identifying a second portion of the piezoelectric transducer array that is within a threshold distance from a boundary of the second area corresponding to the second source object;

generating instructions for the second portion the piezoelectric transducer array based on audio content associated with the second source object in the one or more images; and providing the generated instructions to the second portion of the piezoelectric transducer array, wherein the generated instructions cause the second portion of the array to generate another acoustic pressure wave.

4. The method of claim 3, wherein the generated instructions cause the array to generate the acoustic pressure wave and the another acoustic pressure wave at a same time.

5. The method of claim 1, wherein the acoustic pressure wave is generated at a same time as the source object is presented on the electronic display.

6. The method of claim 1, wherein the electronic display and the array of piezoelectric transducers are separated by a transparent material, and the material includes one or more recesses that form back volumes for one or more piezoelectric transducers of the array of piezoelectric transducers.

7. The method of claim 1, wherein each piezoelectric transducer comprises alternating layers of one or more piezoelectric layers and one or more conductive layers.

8. A device comprising:

an electronic display;

an array of piezoelectric transducers; and a controller configured to:

determine an area corresponding to a source object in one or more images to be displayed on the electronic display, identify a portion of the piezoelectric transducer array within a threshold distance from a boundary of the area corresponding to the source object, generate instructions for at least a portion of the piezoelectric transducer array based on audio content associated with the source object in the one or more images, and provide the generated instructions to at least the portion of the piezoelectric transducer array, wherein the generated instructions cause the portion of the array to generate an acoustic pressure wave, wherein at least one piezoelectric transducer has a fixed end coupled to a transparent surface and a free end opposite to the fixed end, the transparent surface located between the electronic display and the piezoelectric transducer array, and the free end configured to be displaced in a direction towards or away from the transparent surface to generate an acoustic pressure wave.

9. The device of claim 8, wherein the piezoelectric transducer array covers the electronic display.

10. The device of claim 8, wherein the generated instructions cause another portion of the array overlapping in another location with another source object in the one or more images to generate another acoustic pressure wave.

11. The device of claim 10, wherein the generated instructions cause the array to generate the acoustic pressure wave and the another acoustic pressure wave at a same time.

12. The device of claim 8, wherein the acoustic pressure wave is generated at a same time as the source object is presented on the electronic display.

13. The device of claim 8, wherein the electronic display and the array of piezoelectric transducers are separated by a transparent material, and the material includes one or more recesses that form back volumes for one or more piezoelectric transducers of the array of transparent-piezoelectric transducers.

14. The device of claim 8, wherein each piezoelectric transducer comprises additional alternating layers of one or more piezoelectric layers and one or more conductive layers.

15. A non-transitory computer-readable storage medium comprising stored instructions, the instructions when executed by a processor of a device, causing the device to:

determine an area corresponding to a source object in one or more images to be displayed on an electronic display;

identify a portion of a piezoelectric transducer array within a threshold distance from a boundary of the area corresponding to the source object;

generate instructions for at least a portion of the piezoelectric transducer array based on audio content associated with a sound source in to the one or more images; and provide the generated instructions to at least the portion of the piezoelectric transducer array, wherein the generated instructions cause the portion of the array to generate an acoustic pressure wave, wherein at least one piezoelectric transducer has a fixed end coupled to a transparent surface and a free end opposite to the fixed end, the transparent surface located between the electronic display and the piezoelectric transducer array, and the free end configured to be displaced in a direction towards or away from the transparent surface to generate an acoustic pressure wave.

16. The non-transitory computer-readable storage medium of claim 15, wherein the piezoelectric transducer array covers the electronic display.

17. The non-transitory computer-readable storage medium of claim 15, wherein the generated instructions cause another portion of the array overlapping in another location with another source object in the one or more images to generate another acoustic pressure wave.

18. The non-transitory computer-readable storage medium of claim 15, wherein the acoustic pressure wave is generated at a same time as the source object is presented on the electronic display.

* * * * *